United States Patent
Wu et al.

(10) Patent No.: US 11,088,735 B2
(45) Date of Patent: Aug. 10, 2021

(54) WIRELESS COMMUNICATION METHOD AND WIRELESS COMMUNICATION DEVICE

(71) Applicant: Sony Corporation, Tokyo (JP)

(72) Inventors: Liang Wu, Nanjing (CN); Luejun Xu, Nanjing (CN); Zaichen Zhang, Nanjing (CN); Jian Dang, Nanjing (CN); Xiao Chen, Nanjing (CN); Lili Zheng, Nanjing (CN); Penshun Lu, Beijing (CN)

(73) Assignee: SONY CORPORATION, Tokyo (JP)

( * ) Notice: Subject to any disclaimer, the term of this patent is extended or adjusted under 35 U.S.C. 154(b) by 58 days.

(21) Appl. No.: 16/614,381

(22) PCT Filed: Jul. 6, 2018

(86) PCT No.: PCT/CN2018/094751
§ 371 (c)(1),
(2) Date: Nov. 18, 2019

(87) PCT Pub. No.: WO2019/011183
PCT Pub. Date: Jan. 17, 2018

(65) Prior Publication Data
US 2020/0112351 A1 Apr. 9, 2020

(30) Foreign Application Priority Data
Jul. 14, 2017 (CN) .......................... 201710575610.8

(51) Int. Cl.
*H04B 7/0456* (2017.01)
*H04B 7/06* (2006.01)
(Continued)

(52) U.S. Cl.
CPC ......... *H04B 7/0456* (2013.01); *H04B 7/0626* (2013.01); *H04L 5/0007* (2013.01);
(Continued)

(58) Field of Classification Search
CPC ... H04B 7/0456; H04B 7/0486; H04B 7/0482
See application file for complete search history.

(56) References Cited

U.S. PATENT DOCUMENTS

| 2013/0078991 A1 | 3/2013 | Nam |
| 2013/0279403 A1 | 10/2013 | Takaoka |

(Continued)

FOREIGN PATENT DOCUMENTS

| CN | 104717035 A | 6/2015 |
| CN | 105591677 A | 5/2016 |
| CN | 105680925 A | 6/2016 |

OTHER PUBLICATIONS

International Search Report and Written Opinion dated Sep. 14, 2018 for PCT/CN2018/094751 filed on Jul. 6, 2018, 9 pages including English Translation of the International Search Report.

*Primary Examiner* — Kevin Kim
(74) *Attorney, Agent, or Firm* — Xsensus LLP

(57) ABSTRACT

An electronic device for wireless communication with two groups of communication devices, the electronic device comprising a processing circuit, wherein the processing circuit is configured to: acquire a first waveform parameter related to a first group of communication devices, wherein the first waveform parameter is related to the form of a signal waveform for communications by the first group of communication devices; and notify a second group of communication devices of the first waveform parameter such that the second group of communication devices can determine, based on the first waveform parameter, a precoding matrix for communications by the second group of communication devices. Further disclosed are a wireless communication method, a base station, and a second wireless communication device from among one group of communication devices.

20 Claims, 9 Drawing Sheets

(51) Int. Cl.
*H04L 5/00* (2006.01)
*H04L 27/26* (2006.01)
*H04W 68/00* (2009.01)
*H04W 72/08* (2009.01)

(52) U.S. Cl.
CPC ....... *H04L 27/2636* (2013.01); *H04W 68/005* (2013.01); *H04W 72/082* (2013.01)

(56) References Cited

U.S. PATENT DOCUMENTS

| | | |
|---|---|---|
| 2014/0269409 A1 | 9/2014 | Dimou et al. |
| 2017/0111930 A1 | 4/2017 | Rajagopal |
| 2020/0076484 A1* | 3/2020 | Noh .................. H04L 5/001 |

* cited by examiner

US 11,088,735 B2

WIRELESS COMMUNICATION METHOD AND WIRELESS COMMUNICATION DEVICE

CROSS-REFERENCE TO RELATED APPLICATIONS

The present application is based on PCT filing PCT/CN2018/094751, filed Jul. 6, 2018, which claims priority to CN 201710575610.8, filed Jul. 14, 2017, the entire contents of each are incorporated herein by reference.

FIELD

The present disclosure generally relates to wireless communication method and wireless communication device, and in particular to a method and a device for eliminating interference in a mobile communication system.

BACKGROUND

With the development of mobile communications, interference has become one of the key issues limiting system throughput. A lot of research has been done to reduce the influence of interference from two respects of transmitting end and the receiving end. At the transmitting end, the frequency domain and time domain resources are dynamically assigned. In frequency domain, trigger information is transmitted between base stations to control transmission power and other resources. Carrier aggregation is another method, mainly for users at the edge of a cell, which receives data through scheduling of cross-carriers. In time domain, an approximate blank subframe technique is proposed to create a protection subframe for the interfered users by reducing the activity level of interference source in certain subframes. During the protection subframe, the interference source does not transmit any signal, and only the interfered users are active. At the receiving end, some enhanced receiver algorithms have been proposed, mainly including the following technologies: interference suppression technology, which performs linear filtering process on the received signal to suppress the interference; maximum likelihood reception technology, which can obtain optimal performance of the system but is very difficult to be implemented in practical systems due to high complexity; successive interference cancellation technology, which is a compromise between complexity and performance.

Although these technologies increase reuse factor, the overall degree of freedom of the system is not improved.

Interference alignment technology has been proposed in recent years and is effective in canceling interference. It divides signal space into the desired signal space and the interference signal space, and makes the interferences overlap at the receiving end with precoding technique. As such, signal capacity occupied by the interference signal is reduced, and influence of the interference signal on the desired signal is eliminated, thereby increasing the degree of freedom of the system and effectively improving the system throughput.

New waveforms such as Universal Filtered Multicarrier (UFMC), Filtered Orthogonal Frequency Division Multiplexing (F-OFDM) and the like will be used in future mobile communication systems to eliminate the interference caused by different subbands at different frequency offsets. However, all of the interference cancellation techniques described above are based on conventional waveforms without considering characteristics of new waveforms that may be employed in the future mobile communication systems.

Therefore, it is desired to propose an interference cancellation scheme for new waveforms for the future communication, and preferably, the interference cancellation scheme can also be compatible with the conventional waveforms.

SUMMARY

To this end, the present invention proposes an interference cancellation scheme that can address one or more problems described above.

According to an aspect of the invention, an electronic device for performing wireless communication with two groups of communication devices is provided, the electronic device comprises a processing circuitry configured to: obtain a first waveform parameter relating to the first group of communication devices, the first waveform parameter is related to formation of a signal waveform for communication of the first group of communication devices; notify the second group of communication devices of the first waveform parameter, such that the second group of communication devices can determine a precoding matrix for communication of the second group of communication devices based on the first waveform parameter.

According to another aspect of the invention, a second communication device in a first group of communication devices in a communication system is provided, the communication system comprises the first group of communication devices and a second group of communication devices, the second communication device comprises a processing circuitry configured to: determine a precoding matrix for communication of the first group of communication devices based on a first waveform parameter relating to the first group of communication devices and a second waveform parameter relating to the second group of communication devices, wherein the first waveform parameter is related to formation of a signal waveform for communication of the first group of communication devices, and the second waveform parameter is related to formation of a signal waveform for communication of the second group of communication devices.

According to another aspect of the present invention, a communication method in a communication system is provided, said communication system comprises a base station, a first group of communication devices consisting of a first communication device and a second communication device, and a second group of communication devices consisting of a third communication device and a fourth communication device, said method comprises: reporting, by the first communication device in the first group of communication devices, a waveform parameter to the base station, the waveform parameter is related to formation of a signal waveform transmitted by the first communication device; reporting, by the second communication device in the first group of communication devices, channel state information estimated by the second communication device to the base station; notifying, by the base station, the fourth communication device in the second group of communication devices of the waveform parameter and the channel state information obtained from the first group of communication devices; and determining, by the fourth communication device, a precoding matrix for the third communication device in the second group of communication devices, based on a waveform parameter of the third communication device, channel state information estimated by the fourth communication device, and the waveform parameter and the channel state information of the first group of communication devices obtained from the base station.

According to another aspect of the present invention, a base station device in a communication system is provided, the base station device comprises a processing circuitry, the processing circuitry configured to: determine a precoding matrix to be used by a first terminal device served by the base station device based on a first waveform parameter of the first terminal device and a second waveform parameter of a second terminal device served by a neighboring base station, wherein the first waveform parameter is related to formation of a signal waveform transmitted by the first terminal device, and the second waveform parameter is related to formation of a signal waveform transmitted by the second terminal device.

According to another aspect of the present invention, a second communication device in a group of communication devices is provided, said group of communication devices comprises a first communication device and a second communication device in communication with each other, said second communication device comprises a processing circuitry configured to: determine a precoding matrix to be used by the first communication device based on a first waveform parameter of the first communication device and a second waveform parameter of a terminal device served by a base station which is obtained from the base station, wherein the first waveform parameter is related to formation of a signal waveform transmitted by the first communication device, and the second waveform parameter is related to formation of a signal waveform transmitted by the terminal device.

According to another aspect of the present invention, a communication method in a communication system is provided, the method comprises: obtaining, by a base station, a first waveform parameter of a first terminal device served by the base station; obtaining, by the base station, a second waveform parameter of a second terminal device served by a neighboring base station from the neighboring base station; and determining, by the base station, a precoding matrix to be used by the first terminal device based on the first waveform parameter and the second waveform parameter, wherein the first waveform parameter is related to formation of a signal waveform transmitted by the first terminal device, and the second waveform parameter is related to formation of a signal waveform transmitted by the second terminal device.

According to another aspect of the present invention, a computer storage medium having stored thereon a program which, when executed, causes a computer to implement the communication method as described above is provided.

BRIEF DESCRIPTION OF THE DRAWINGS

The invention may be better understood by referring to the following description given in conjunction with the drawings, in which the same or similar reference numerals are used throughout the drawings to represent the same or similar parts. The drawings together with the following detailed description are incorporated in and constitute a part of this specification, to further illustrate the preferred embodiments of the invention and to explain the principle and advantage of the invention. In the drawings.

DETAILED DESCRIPTION OF EMBODIMENTS

The invention proposes an interference cancellation scheme suitable for new waveforms (for example, time domain filtering based UFMC, F-OFDM), and the scheme of the present invention will be described in the following by taking UFMC as an example. However, it should be noted that the solution of the present invention is also applicable to conventional multi-carrier waveform, including Cyclic prefix orthogonal frequency division multiplexing (CP-OFDM), and Discrete Fourier transform spread OFDM (DFT-S-OFDM) and the like.

Figure 1:
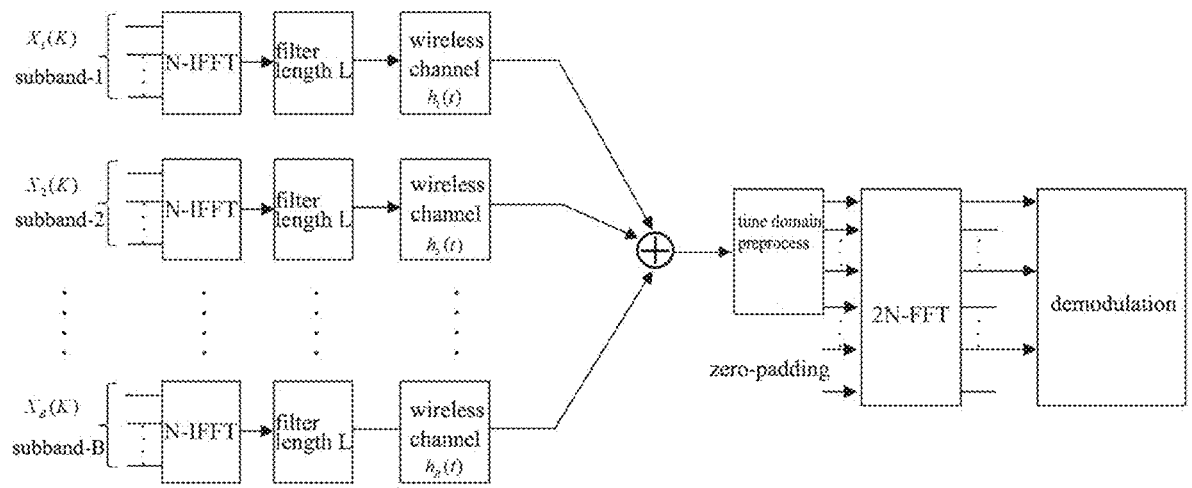
FIG. 1 schematically shows a block diagram of UFMC uplink transmission.

FIG. 1 shows a schematic block diagram of a multi-user UFMC uplink transmission.

As shown in FIG. 1, the total N subcarriers are divided into B subbands, each subband occupies N/B subcarriers, and each user can be assigned one or more subbands. For the ith subband, the frequency domain signal Xi with the length NB is transformed into the time domain by an N-point inverse fast Fourier transform (IFFT). After the IFFT, for each subband, the time domain signal passes through a filter with the length L, and then the filtered signal is transmitted to the receiving end over the wireless channel.

At the receiving end, the received signal is first preprocessed in the time domain, for example, the frequency offset compensation is performed by a continuous phase rotation in the time domain. In addition, zero-padding is performed on the received one frame of signal for the subsequent 2N-point fast Fourier transform (FFT), which is used to transform the time domain signal into the frequency domain. Demodulation is performed after the FFT. Since the transmitting end has a total of N subcarriers and the receiving end performs a 2N-point FFT, useful information are carried on only even numbered subcarriers in the frequency domain signal at the receiving end, according to the corresponding relationship in the frequency domain. Therefore, in demodulation, information on even numbered subcarriers is used to restore information on the N subcarriers at the transmitting end.

Figure 2:
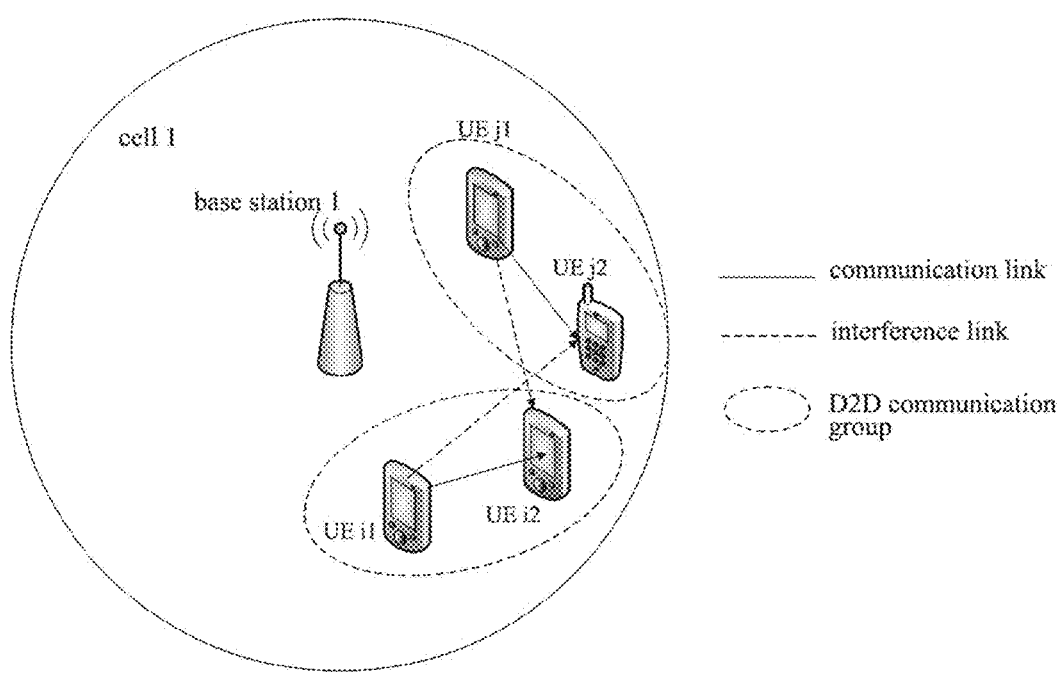
FIG. 2 schematically shows a communication scenario in which interference exists according to the first embodiment of the present invention.

FIG. 2 shows a scenario in which interference exists between D2D user equipment groups within coverage of a cell according to the first embodiment of the present invention. The user equipment i1 (UE i1) and the user equipment i2 (UE i2) are a group of user equipments that perform D2D communication, and the user equipment j1 (UE j1) and the user equipment j2 (UE j2) are another group of user equipments that perform D2D communication. The two groups of user equipments are located within the coverage of the base station 1 and operate in the same frequency band, so there is interference between them. In FIG. 2, the communication links between the respective groups of user equipments in are shown in solid lines, and the interference links between the two groups of user equipments are shown in dashed lines. In the following, it is assumed that the user equipment i1 and the user equipment j are transmitting devices, and the user equipment i2 and the user equipment j2 are receiving devices.

The IFFT transformation matrix W(N) is defined as follows:

$$W(N) = \begin{bmatrix} e^{-j\frac{2\pi}{N}0} & e^{-j\frac{2\pi}{N}0} & e^{-j\frac{2\pi}{N}0} & \cdots & e^{-j\frac{2\pi}{N}0} \\ e^{-j\frac{2\pi}{N}0} & e^{-j\frac{2\pi}{N}} & e^{-j\frac{2\pi}{N}2} & \cdots & e^{-j\frac{2\pi}{N}(N-1)} \\ e^{-j\frac{2\pi}{N}0} & e^{-j\frac{2\pi}{N}2} & e^{-j\frac{2\pi}{N}4} & \cdots & e^{-j\frac{2\pi}{N}2(N-1)} \\ \vdots & \vdots & \ddots & \ddots & \vdots \\ e^{-j\frac{2\pi}{N}0} & e^{-j\frac{2\pi}{N}(N-2)} & e^{-j\frac{2\pi}{N}2(N-2)} & \cdots & e^{-j\frac{2\pi}{N}(N-2)(N-1)} \\ e^{-j\frac{2\pi}{N}0} & e^{-j\frac{2\pi}{N}(N-1)} & e^{-j\frac{2\pi}{N}2(N-1)} & \cdots & e^{-j\frac{2\pi}{N}(N-1)(N-1)} \end{bmatrix} \quad (1)$$

where N is the size of the IFFT transformation.

In addition, the frequency offset matrix is defined as follows:

$$D(\varepsilon_{i,j}, K) = \begin{bmatrix} 1 & 0 & \cdots & 0 \\ 0 & e^{-j\frac{2\pi\varepsilon_{i,j}}{N}} & \cdots & 0 \\ \vdots & & \cdots & \\ 0 & 0 & \cdots & e^{-j\frac{2\pi\varepsilon_{i,j}}{N}(K-1)} \end{bmatrix} \quad (2)$$

where $\varepsilon_{i,j}$ represents frequency offset between the j-th user and the i-th user.

It is assumed herein that each resource block has $$N_1 = \frac{N}{4}$$

subcarriers. Therefore, in frequency domain, the signals received by the user equipment i2 and the user equipment j2 shown in FIG. 2 can be expressed as:

$$R_{i2} = \underbrace{[W(2N)]_{1:2N_1} \Omega_r H_{i2,i1} D(\varepsilon_{i2,i1}, N + L_{FIR} - 1) F_{i1} [W(N)]_{i:N_1}^H X_{i1}}_{\triangleq \tilde{H}_{i2,i1}} + \quad (3)$$

$$\underbrace{[W(2N)]_{1:2N_1} \Omega_r H_{i2,j1} D(\varepsilon_{i2,j1}, N + L_{FIR} - 1) F_{j1} [W(N)]_{i:N_1}^H X_{j1}}_{\triangleq \tilde{H}_{i2,j1}} + Z_{i2}$$

$$R_{j2} = \underbrace{[W(2N)]_{1:2N_1} \Omega_r H_{j2,i1} D(\varepsilon_{j2,i1}, N + L_{FIR} - 1) F_{i1} [W(N)]_{i:N_1}^H X_{i1}}_{\triangleq \tilde{H}_{j2,i1}} + \quad (4)$$

$$\underbrace{[W(2N)]_{1:2N_1} \Omega_r H_{j2,j1} D(\varepsilon_{j2,j1}, N + L_{FIR} - 1) F_{j1} [W(N)]_{i:N_1}^H X_{j1}}_{\triangleq \tilde{H}_{j2,j1}} + Z_{j2}$$

where $X_{(m)} [X_{(m)}(0), X_{(m)}(1), \ldots, X_{(m)}(N_1-1)]^T$ represents the frequency domain signal transmitted by the m-th user equipment. For example, $X_{i1}$ and $X_{j1}$ in the above equations respectively represent the frequency domain signals transmitted by the user equipment i1 and the user equipment j1. In addition, $[\bullet]^T$ represents transposition; $[\bullet]^H$ represents conjugate transposition; $[\bullet]_{1:N_1}$ represents taking the elements of the first N1 rows of the matrix; $F_m$ represents the Topplitz matrix constructed by the coefficients of the filter (the filter with the length L shown in FIG. 1) used by the m-th user equipment, the size of the matrix is $(N+L_{FIR}-1) \times N$ and the first column thereof is $[f_m(0), f_m(1), \ldots, f_m(L_{FIR}-1), 0, \ldots, 0]^T$, where $L_{FIR}$ represents the length of the filter; $H_{m,n}$ is the Topplitz matrix constructed by the channel coefficients from the n-th user equipment to the m-th user equipment, the size of the matrix is $(N+L_{FIR} L_{ch}-2) \times (N+L_{FIR}-1)$, and the first column thereof is $[h_{m,n}(0), h_{m,n}(1), \ldots, h_{m,n}(L_{ch}-1), 0, \ldots, 0]^T$, where $L_{ch}$ represents the length of channel;

$$\Omega_r = \begin{bmatrix} I_{N+L_{FIR}+L_{ch}-2} \\ 0 \end{bmatrix} \in R^{2N \times (N+L_{FIR}+L_{ch}-2)}$$

is a zero-padding matrix, where $I_{N+L_{FIR}+L_{ch}-2}$ is a unit matrix with the rank of $N+L_{FIR}+L_{ch}-2$; $z_{i2}$ and $z_{j2}$ are noise components. In equations (3) and (4), the symbol $\triangleq$ means "defining", so that a long expression can be represented by a concise symbol. As indicated by the symbol $\triangleq$, in equations (3) and (4), the channel matrices $\tilde{H}_{i2,i1}$, $\tilde{H}_{i2,j1}$, $\tilde{H}_{j2,i1}$, $\tilde{H}_{j2,j1}$, which are all $2N_1 \times N_1$ matrices, are defined. The channel matrices $\tilde{H}_{i2,i1}$, $\tilde{H}_{i2,j1}$, $\tilde{H}_{j2,i1}$, $\tilde{H}_{j2,j1}$ reflect the characteristics of the transmission channels of the user equipment i1 to the user equipment i2, the user equipment j1 to the user equipment i2, the user equipment i1 to the user equipment j2, and the user equipment j1 to the user equipment j2, respectively.

It should be noted that in the UFMC system, a filter is introduced for each subband, the filter determines the waveform of the transmitted signal. Therefore, it can be considered that the filter coefficient matrix F in the equations (3) and (4) represents a waveform parameter related to the formation of a signal waveform. However, the waveform parameters discussed in the present invention are not limited to the matrix F described above, and in other systems (e.g., F-OFDM), the waveform parameters may appear in different forms.

As described above, in the UFMC system, after the signal is transformed into frequency domain by 2N-point FFT at the receiving end, useful information are carried on only even numbered subcarriers. As such, the equivalent channel matrix is defined as follows:

$$\begin{cases} G_{i2,i1} = \tilde{H}_{i2,i1}(1:2:2N_1, :) \\ G_{i2,j1} = \tilde{H}_{i2,j1}(1:2:2N_1, :) \\ G_{j2,i1} = \tilde{H}_{j2,i1}(1:2:2N_1, :) \\ G_{j2,j1} = \tilde{H}_{j2,j1}(1:2:2N_1, :) \end{cases} \quad (5)$$

where $\tilde{H}_{m,n}(1:2:2N_1,:)$ represents taking out N rows of the matrix $H_{m,n}$ at intervals.

In order to eliminate interference between the two groups of D2D user equipments shown in FIG. 2, the present invention proposes a precoding based interference cancellation method. Let $P_{i1}$ and $P_{j1}$ represent the frequency domain precoding matrix used by the user equipment i1 and the user equipment j1, respectively.

Firstly, the vector space $G_{i2,i1}P_{i1}$ should be orthogonal to the vector space $G_{i2,j1}P_{j1}$, such that for the user equipment i2, the signal (useful signal) from the user equipment i1 will be orthogonal to the signal (interference signal) from the user equipment j1. Therefore, it can be derived that the vector space $P_{i1}$ is orthogonal to the vector space $(G_{i2,j1})^H G_{i2,j1} P_{j1}$, where $(\bullet)^H$ presents conjugate transposition.

Secondly, the vector space $G_{j2,i1}P_{i1}$ should be orthogonal to the vector space $G_{j2,i1}P_{j1}$, such that for the user equipment j2, the signal (interference signal) from user equipment i1 will be orthogonal to the signal (useful signal) from the user equipment j1. Thus, it can be derived that the vector space $P_{j1}$ and the vector space $(G_{j2,i1})^H G_{j2,i1} P_{j1}$ are orthogonal to each other.

Therefore, the vector space constructed by $(G_{i2,i1})^H G_{i2,j1} P_{j1}$ and the vector space constructed by $(G_{j2,i1})^H G_{j2,j1} P_{j1}$ are the same space, then it can be derived that $$P_{j1} = \text{feature vector}\{\underbrace{((G_{i2,i1})^H G_{i2,j1})^{-1}((G_{j2,i1})^H G_{j2,j1})}_{\triangleq G_{j1,orth}}\} \quad (6)$$

where the defined $G_{j1,orth}$ is $N_1 \times N_1$ matrix. In order to allow the interference between two groups of user equipments to be eliminated, the frequency domain precoding matrix $P_{j1}$ of the user equipment j1 consists of $N_1/2$ feature vectors of the matrix $G_{j1,orth}$. The precoding matrix $P_{i1}$ of the user equipment i1 can be obtained in a similar manner.

After obtaining the frequency domain precoding matrix $P_{j1}$ and $P_{i1}$, the signals transmitted by the user equipment i1 and the user equipment j1 can be expressed as:

$$X_{i1} = P_{i1} S_{i1} \quad (7)$$

$$X_{j1} = P_{j1} S_{j1} \quad (8)$$

where $S_{i1}$ and $S_{j1}$ are frequency domain information vectors for the user equipment i1 and user equipment j.

As can be seen from the above, in the process of calculating the frequency domain precoding matrix, the waveform parameters (for example, filter coefficient matrix F) are considered. As such, the calculated precoding matrix can be adapted to the characteristics of the new waveforms. The transmitting end performs precoding using this precoding matrix, so that the interference signal and the useful signal are within orthogonal spaces, thereby realizing the effect of interference cancellation.

Figure 3:
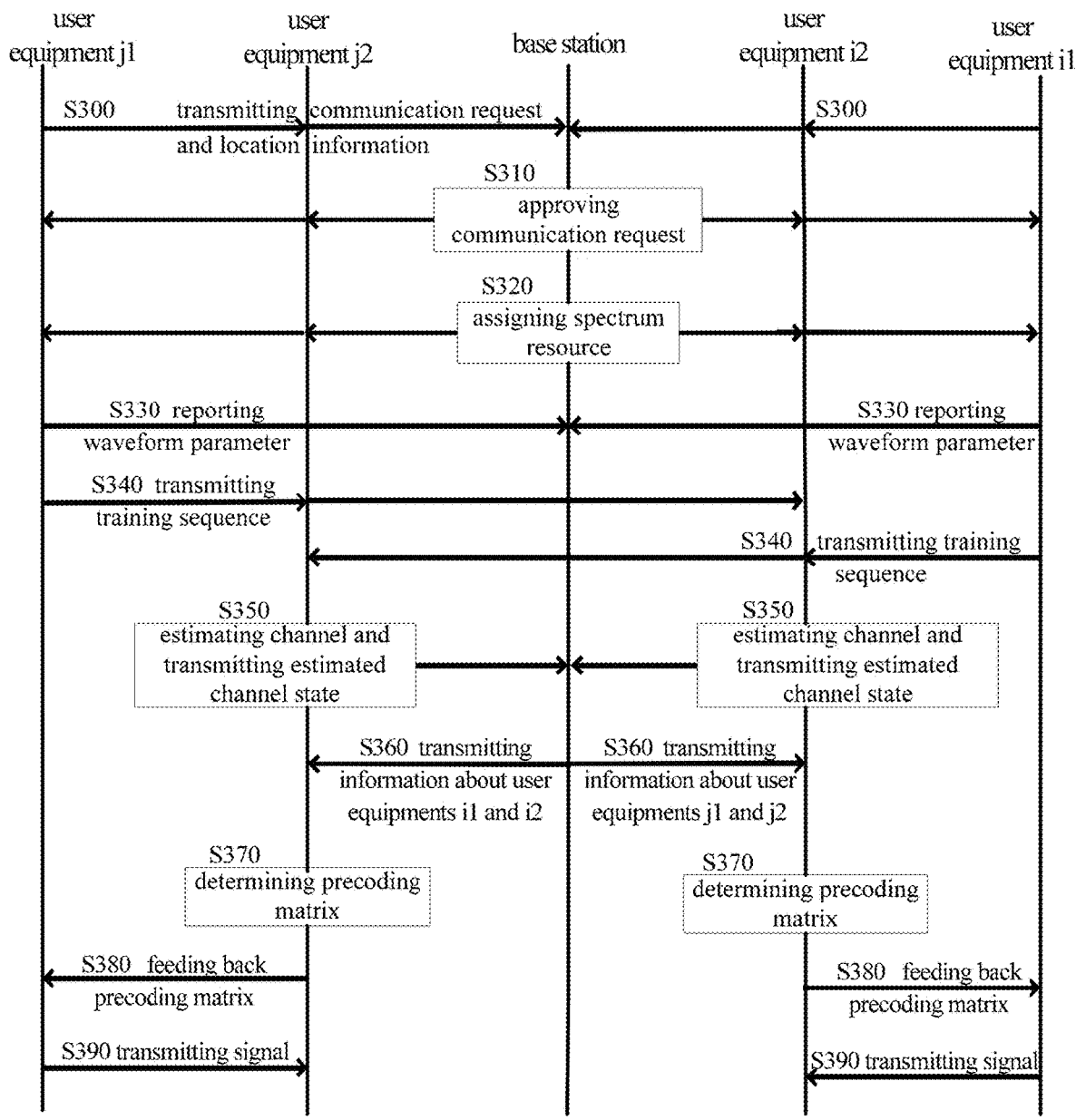
FIG. 3 shows a signaling interaction diagram of an interference cancellation scheme according to a first embodiment of the present invention.

FIG. 3 shows a signaling interaction diagram of a scheme for eliminating the interference between two groups of user equipments in the scenario shown in FIG. 2. In FIG. 3, it is also assumed that the user equipments i1, j1 are transmitting devices, and the user equipments i2, j2 are receiving devices.

As shown in FIG. 3, in step S300, the user equipments i1, i2 and the user equipments j1, j2 transmit a D2D communication request to the base station, and report their location information to the base station at the same time.

The base station indicates to the two groups of user equipments that the D2D communication request is approved in step S310, and assigns spectrum resources to the respective user equipments in step S320. For example, the base station may assign the same spectrum resource to two groups of user equipments for the purpose of saving spectrum resources or in the case that the spectrum resources are limited. In this case, the base station indicates to the two groups of user equipments that the interference cancellation will be performed.

In response to the indication from the base station, the user equipment i1 and the user equipment j1 report their own waveform parameters to the base station in step S330. The waveform parameters determine the formation of signal waveforms transmitted by the user equipments i1, j1 and may, for example, include one or more of type of multi-carrier filter, filter length, out-of-band attenuation of filter, length of FFT\IFFT transformation, carrier spacing, number of data streams transmitted in parallel, length of discrete Fourier transform (DFT) extension, and the like.

Subsequently, in step S340, the user equipment i1 transmits a training sequence for the user equipment i2 and the user equipment j2 estimating the state of the channel from the user equipment i1. Likewise, the user equipment j1 transmits a training sequence for the user equipment i2 and user equipment j2 estimating the channel from the user j1.

The user equipment i2 estimates the state information of the channels from the user equipments i1 and j1 based on the received training sequences from the user equipments i1 and j1, and reports the estimated channel state information to the base station. Similarly, the user equipment j2 estimates the state information of the channels from the user equipments i1 and j1 based on the received training sequence, and reports the estimated channel state information to the base station, as shown in step S350.

The base station notifies information about one group of user equipments to another group of user equipments in step S360. Specifically, the base station transmits the waveform parameter of the user equipment i1 and the channel state information estimated by the user equipment i2 to the user equipment j2, and transmits the waveform parameter of the user equipment j1 and the channel state information estimated by the user j2 to the user equipment i2.

Thus, the user equipment j2 as the receiving device can obtain the waveform parameters of another group of transmitting devices i1 and the channel state information estimated by the receiving device i2 from the base station, that is, obtain the matrix Fi and matrices $H_{i2,i1}$ and $H_{i2,j1}$ in equations (3) and (4). Furthermore, the user equipment j2 can obtain the matrices $H_{j2,i1}$ and $H_{j2,j1}$ in equations (3) and (4) by channel estimation performed by itself. Further, the user equipment j2 may previously receive waveform parameters (that is, filter matrix $F_{j1}$ in equations (3) and (4)) of the same group of transmitting devices j1 from the transmitting devices j1 (not shown in figure). It should be noted that the user equipment j2 can acquire its waveform parameters from the user equipment j1 at any time after establishing communication with the user equipment j1. Alternatively, the user equipment j2 may also obtain the waveform parameters of the user equipment j1 from the base station.

At this time, the user equipment j2 can determine the channel matrices $\tilde{H}_{i2,i1}$, $\tilde{H}_{i2,j1}$, $\tilde{H}_{j2,i1}$, $\tilde{H}_{j2,j1}$ according to equations (3) and (4), and further determine the equivalent channel matrix according to equation (5), and calculate the precoding matrix $P_{j1}$ for the same group of transmitting devices j1 according to equation (6), as shown in step S370. In the same manner, the user equipment i2 as the receiving device can also calculate the precoding matrix $P_{i1}$ for the same group of the transmitting devices i1 based on the information received from the base station and the result of channel estimation performed by itself.

Then, in step S380, the user equipment i2 and the user equipment j2 respectively feed back the calculated frequency domain precoding matrices to the user equipment i1 and the user equipment j1 of the corresponding transmitting end. For example, the user equipment i2 and the user equipment j2 may transmit precoding matrix indices to the user equipment i1 and the user equipment j1, respectively.

Thereafter, the user equipment i1 and the user equipment j1 transmit signals using the received precoding matrix, as shown in step S390.

Figure 4:
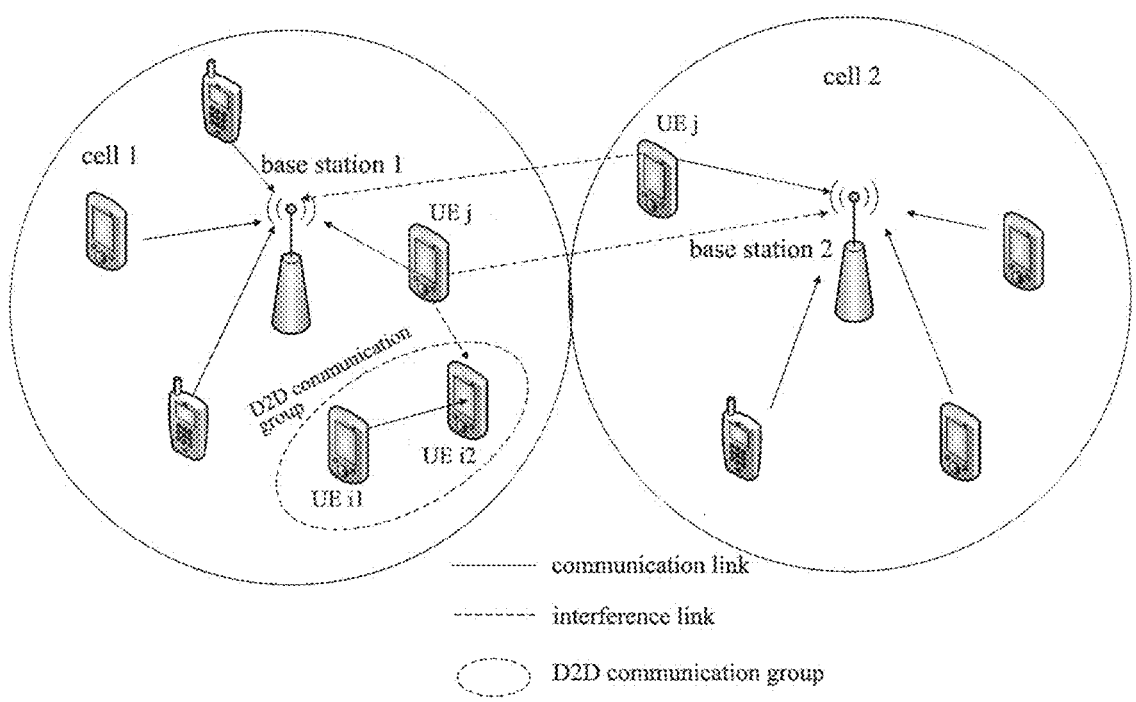
FIG. 4 schematically shows a communication scenario in which interference exists according to a second embodiment of the present invention.

FIG. 4 shows a scenario in which both of inter-cell interference and D2D user equipment interference exist according to the second embodiment of the present invention. As shown in FIG. 4, there are two cells respectively managed by the base station 1 and the base station 2, and each base station serves several user equipments. The user equipment j (UE j) in the cell 1 and the user equipment j (UE j) in the cell 2 are located at the edge of the respective cells, and they use the same time and frequency resources and thus have interference with each other, that is, inter-cell interference. The user equipment i1 (UE i1) and the user equipment i2 (UE i2) are a group of user equipments performing D2D communication within the cell 1, and they use the same time and frequency resources as the user equipment j. Therefore, the user equipment i1 and the user equipment i2 will be subjected to the interference caused by uplink signal from the user equipment j in the cell 1 during communication, that is, the D2D user equipment interference. In the following, it is assumed that the user equipment i1 is a transmitting device and the user equipment i2 is a receiving device.

Each resource block has $$N_1 = \frac{N}{4}$$

subcarriers during transmission. Therefore, in frequency domain, the signal received by the base station 1 can be expressed as:

$$Y_1 = \underbrace{\frac{[W(2N)]_{1:2N_1} \Omega_r H_{1,(1,j)} D(\varepsilon_{1,(1,j)},}{N + L_{FIR} - 1) F_{(1,j)}[W(N)]_{i:N_2}^H}}_{\triangleq \tilde{H}_{1,(1,j)}} X_{(1,j)} + \underbrace{\frac{[W(2N)]_{1:2N_1} \Omega_r H_{1,(2,j)} D(\varepsilon_{1,(2,j)}, N + L_{FIR} - 1) F_{(2,j)}[W(N)]_{i:N_2}^H}}{\triangleq \tilde{H}_{1,(2,j)}}}_{} X_{(2,j)} + D_1 \quad (9)$$

The signal received by the base station 2 can be expressed as:

$$Y_2 = \underbrace{\frac{[W(2N)]_{1:2N_1} \Omega_r H_{2,(1,j)} D(\varepsilon_{2,(1,j)},}{N + L_{FIR} - 1) F_{(1,j)}[W(N)]_{i:N_1}^H}}_{\triangleq \tilde{H}_{2,(1,j)}} X_{(1,j)} + \underbrace{\frac{[W(2N)]_{1:2N_1} \Omega_r H_{2,(2,j)} D(\varepsilon_{2,(2,j)}, N + L_{FIR} - 1) F_{(2,j)}[W(N)]_{1:N_1}^H}}{\triangleq \tilde{H}_{2,(2,j)}}}_{} X_{(2,j)} + D_2 \quad (10)$$

-continued $$R_{i2} = \underbrace{\frac{[W(2N)]_{1:2N_1} \Omega_r H_{(1,i2),(1,j)} D(\varepsilon_{(1,i2),(1,j)},}{N + L_{FIR} - 1) F_{(1,j)}[W(N)]_{1:N_1}^H}}_{\triangleq \tilde{H}_{(1,i2),(1,j)}} X_{(1,j)} + \underbrace{\frac{[W(2N)]_{1:2N_1} \Omega_r H_{(1,i2),(1,i1)} D(\varepsilon_{(1,i2),(1,i1)}, N + L_{FIR} - 1) F_{(1,i1)}[W(N)]_{1:N_1}^H}}{\triangleq \tilde{H}_{(1,i2),(1,i1)}}}_{} X_{(1,i1)} + D_3 \quad (11)$$

where $\varepsilon_{m,(n,k)}$ represents the frequency offset between the user equipment k in the cell n and the base station m, for example, $\varepsilon_{1,(2,j)}$ represents the frequency offset between the user equipment j in the cell 2 and the base station 1; and $\varepsilon_{(m,p),(n,k)}$ represents the frequency offset between the user equipment k in the cell n and the user equipment p in the cell m. For example, $\varepsilon_{(1,i2),(1,j)}$ represents the frequency offset between the user equipment j in the cell 1 and the user equipment i2 in the cell 1. Further, $X_{(m,n)} = [X_{(m,n)}(0), X_{(m,n)}(1), \ldots, X_{(m,n)}(N_1-1)]^T$ represents the frequency domain signal transmitted by the user equipment n in the cell m. For example, $X_{(1,j)}$ represents the frequency domain signal transmitted by the user equipment j in the cell 1. $[\bullet]_{1:N_1}$ represents taking the elements of the first N1 rows of the matrix. $F_{(m,n)}$ represents the Topplitz matrix constituted by the filter coefficients used by the user equipment n in the cell m. For example, $F_{(1,j)}$ represents a matrix of filter coefficients used by the user equipment j in the cell 1. Similar to the first embodiment, the matrix F represents waveform parameters related to formation of a signal waveform, but the waveform parameters in the present invention are not limited thereto. The size of the matrix $F_{(m,n)}$ is $(N+L_{FIR}-1) \times N$, and the first column thereof is $[f_{(m,n)}(0), f_{(m,n)}(1), \ldots, f_{(m,n)}(L_{FIR}-1), 0, \ldots, 0]^T$, where $L_{FIR}$ represents the length of the filter. $H_{m,(n,k)}$ is the Topplitz matrix constituted by channel coefficients from the user equipment k in the cell n to the base station m. For example, $H_{1,(2,j)}$ represents a matrix of channel coefficients from the user equipment j in the cell 2 to the base station 1. The size of the matrix is $(N+L_{FIR}+L_{ch}-2) \times (N+L_{FIR}-1)$ and the first column thereof is $[h_{m,(n,k)}(0), h_{m,(n,k)}(1), \ldots, h_{m,(n,k)}(L_{ch}-1), 0, \ldots, 0]^T$, where $L_{ch}$ represents the length of channel. $H_{(m,p),(n,k)}$ is the Topplitz matrix constituted by channel coefficients from the user equipment k in the cell n to the user equipment p in the cell m. For example, $H_{(1,i2),(1,j)}$ represents a matrix of channel coefficients from the user equipment j in the cell 1 to the user equipment i2 in the cell 2. The size of the matrix is $(N+L_{FIR}+L_{ch}-2) \times (N+L_{FIR}-1)$, and the first column thereof is $[h_{(m,p)(n,k)}(0), h_{(m,p)(n,k)}(1), \ldots, h_{(m,p)(n,k)}(L_{ch}-1), 0, \ldots, 0]^T$. In addition, $$\Omega_r = \begin{bmatrix} I_{N+L_{FIR}+L_{ch}-2} \\ 0 \end{bmatrix} \in R^{2N \times (N+L_{FIR}+L_{ch}-2)}$$

is a zero-padding matrix, where $I_{N+L_{FIR}+L_{ch}-2}$ is a unit matrix with the rank of $N+L_{FIR}+L_{ch}-2$, and $D_1$, $D_2$, and $D_3$ are noise components. The symbol $\triangleq$ means "defining", that is, long expressions in equations (9)-(11) are defined as channel matrices $\tilde{H}_{1,(1,j)}$, $\tilde{H}_{1,(2,j)}$, $\tilde{H}_{2,(1,j)}$, $\tilde{H}_{2,(2,j)}$, $\tilde{H}_{(1,i2),(1,j)}$ and $\tilde{H}_{(1,i2),(1,i1)}$ respectively. The size of each of these channel matrices is $2N_1 \times N_1$.

In the UFMC system, after the signal is transformed into frequency domain by 2N-point FFT at the receiving end, useful information are carried on only even numbered subcarriers. Therefore, the equivalent channel matrix is defined as follows:

$$\begin{cases} G_{1,(1,j)} = \tilde{H}_{1,(1,j)}(1:2:2N_1,:) \\ G_{1,(2,j)} = \tilde{H}_{1,(2,j)}(1:2:2N_1,:) \\ G_{2,(1,j)} = \tilde{H}_{2,(1,j)}(1:2:2N_1,:) \\ G_{2,(2,j)} = \tilde{H}_{2,(1,j)}(1:2:2N_1,:) \\ G_{(1,i2),(1,j)} = \tilde{H}_{(1,i2),(1,j)}(1:2:2N_1,:) \\ G_{(1,i2),(1,i1)} = \tilde{H}_{(1,i2),(1,i1)}(1:2:2N_1,:) \end{cases} \quad (12)$$

where $\tilde{H}(1:2:2N_1,:)$ represents taking out N1 rows of the matrix $\tilde{H}$ at intervals.

In order to eliminate the inter-cell interference and the interference of the serving user equipment in the cell to the D2D user equipment as shown in FIG. 4, the present invention proposes a precoding-based interference cancellation method. Let $P_{(1,j)}$, $P_{(1,i1)}$, and $P_{(2,j)}$ represent the frequency domain precoding matrices of the user equipment j in the cell 1, the user equipment i1 in the cell 1 and the user equipment j in the cell 2, respectively.

Firstly, the vector space $G_{1,(2,j)}P_{(2,j)}$ should be orthogonal to the vector space $G_{1,(1,j)}P_{(1,j)}$, such that for the base station 1, the signal (interference signal) from the user equipment j in the cell 2 is orthogonal to the signal (useful signal) from the user equipment j in the cell 1. Thus, it can be derived that the vector space $P_{(1,j)}$ is orthogonal to the vector space $(G_{1,(1,j)})^H G_{1,(2,j)}P_{(2,j)}$, where $(\cdot)^H$ represents conjugate transposition.

Secondly, the vector space $G_{2,(1,j)}P_{(1,j)}$ should be orthogonal to the vector space $G_{2,(2,j)}P_{(2,j)}$, such that for the base station 2, the signal (interference signal) from the user equipment j in the cell 1 is orthogonal to the signal (useful signal) from the user equipment j in in cell 2. Therefore, it can be derived that the vector space $P_{(1,j)}$ is orthogonal to the vector space $(G_{2,(1,j)})^H G_{2,(2,j)}P_{(2,j)}$.

Therefore, the vector space constructed by $(G_{2,(1,j)})^H G_{2,(2,j)}P_{(2,j)}$ and the vector space constructed by $(G_{1,(1,j)})^H G_{1,(2,j)}P_{(2,j)}$ are the same space, and then it is derived that:

$$P_{(2,j)} = \text{feature vector}\{\underbrace{((G_{2,(1,j)})^H G_{2,(2,j)})^{-1}((G_{1,(1,j)})^H G_{1,(2,j)})}_{\triangleq G_{(2,j),\text{orth}}}\} \quad (13)$$

where the defined $G_{(2,j),orth}$ is a $N_1 \times N_1$ matrix. In order to eliminate the interference between the user equipment j in cell 1 and the user equipment j in cell 2, the frequency domain precoding matrix $P_{(2,j)}$ of the user equipment j in cell 2 consists of $N_1/2$ feature vectors of the matrix $G_{(2,j),orth}$. The precoding matrix $P_{(1,j)}$ of the user equipment j in cell 1 can be calculated and obtained in a similar manner.

On the other hand, in order to eliminate the interference of the user equipment j in the cell 1 to the D2D user equipment i2, the vector space $G_{(1,i2),(1,j)}P_{(1,j)}$ and the vector space $G_{(1,i2),(1,i1)}P_{(1,i1)}$ should be orthogonal to each other, such that for the user equipment i2, the signal (interference signal) from the user equipment j in the cell 1 is orthogonal to the signal (useful signal) from the transmitting device i1 for the D2D communication. Therefore, it can be derived that the vector space $P_{(1,i1)}$ and the vector space $G_{(1,i2),(1,i1)}^H$ $G_{(1,i2),(1,j)}P_{(1,j)}$ are orthogonal to each other. That is, the precoding matrix $P_{(1,i1)}$ of the user equipment i1 in the cell 1 corresponds to the zero space of $G_{(1,i2),(1,i1)}^H G_{(1,i2),(1,j)}P_{(1,j)}$, which can be expressed as follows:

$$P_{(1,i1)} \perp G_{(1,i2),(1,i1)}^H G_{(1,i2),(1,j)}P_{(1,j)} \quad (14)$$

After obtaining the frequency domain precoding matrix $P_{(1,j)}$, $P_{(1,i1)}$, and $P_{(2,j)}$, the signals transmitted by the user equipment j in the cell 1, the user equipment i1 in the cell 1, and the user equipment j in the cell 2 can be respectively expressed as:

$$X_{(1,j)} = P_{(1,j)}S_{(1,j)} \quad (15)$$

$$X_{(1,i1)} = P_{(1,i1)}S_{(1,i1)} \quad (16)$$

$$H_{(2,j)} = P_{(2,j)}S_{(2,j)} \quad (17)$$

where S is frequency domain information vector for the user equipment.

Figure 5:
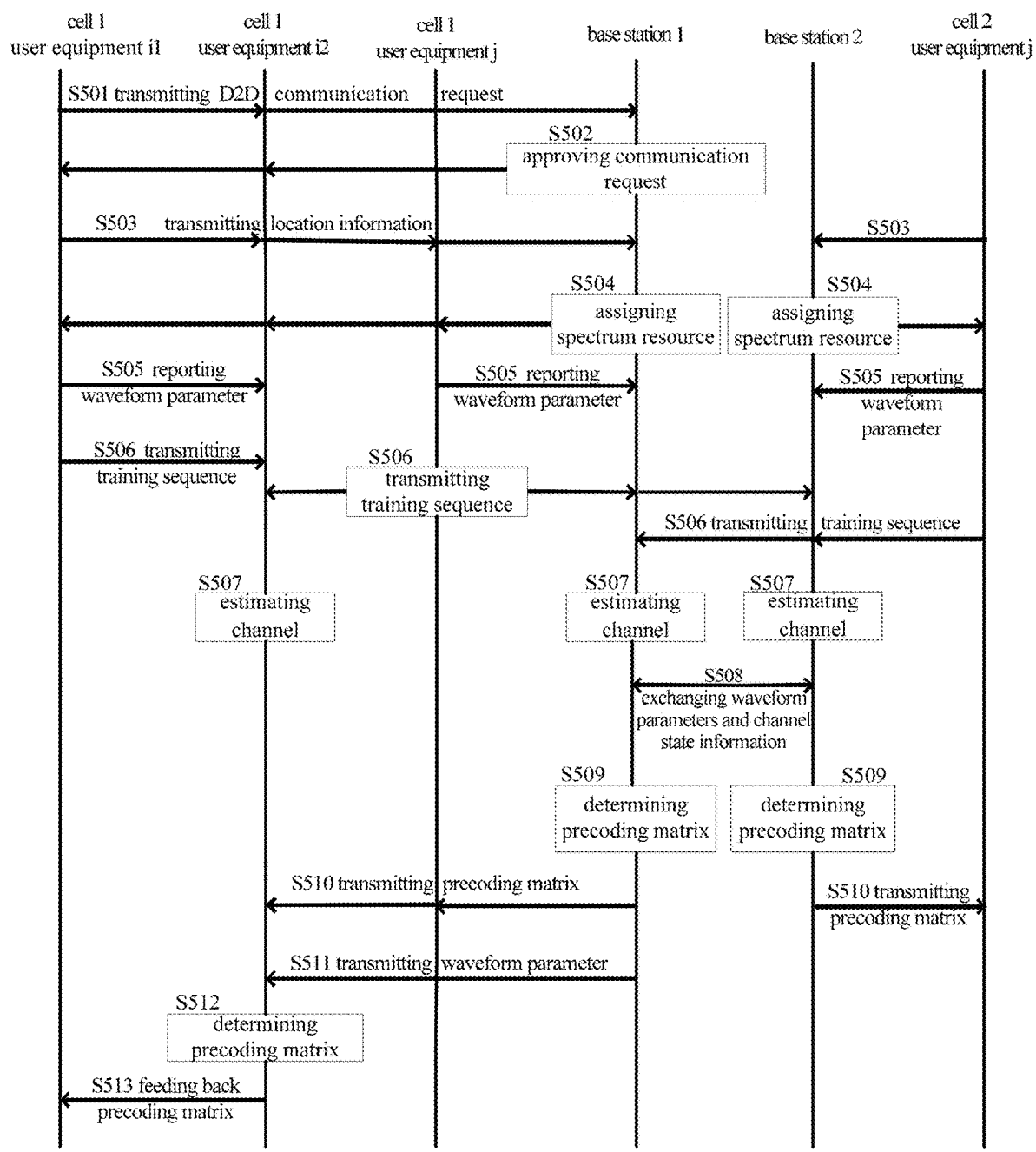
FIG. 5 shows a signaling interaction diagram of an interference cancellation scheme according to a second embodiment of the present invention.

FIG. 5 shows a signaling interaction diagram of a scheme for eliminating the inter-cell interference and the D2D user equipment interference in the scenario shown in FIG. 4. In FIG. 5, it is assumed that among a group of user equipments that perform D2D communication, the user equipment i1 is a transmitting device, and the user equipment i2 is a receiving device.

As shown in FIG. 5, in step S501, the user equipments i1, i2 transmit a D2D communication request to the base station 1. The base station 1 indicates to the user equipments i1, i2 that the D2D communication request is approved in step S502. Subsequently, in step S503, the user equipments i1, i2 and the user equipment j in the cell 1 report their own location information to the base station 1, and the user equipment j in the cell 2 reports its location information to the base station 2. It should be noted that the manner of reporting location information is not limited to the one shown in the figure. For example, the user equipments i1, i2 may report the location information while transmitting the D2D communication request, and the user equipment j in the two cells may also report their own location information to the base station 1 or the base station 2 before the user equipments i1, i2 transmit the D2D communication request.

Subsequently, for example, through negotiation, the base station 1 and the base station 2 can respectively assign spectrum resources to the user equipments managed by them, and instruct these user equipments to perform interference cancellation, as shown in step S504.

In step S505, in response to the instruction of the base station, the user equipment j in the cell 1 reports its own waveform parameter to the base station 1, and the user equipment j in the cell 2 reports the waveform parameter to the base station 2. As the transmitting end for the D2D communication, the user equipment i1 reports its waveform parameters to the receiving device i2.

In step S506, the user equipment j in the cell 1 transmits a training sequence for the base station 1, the base station 2, and the user equipment i2 to estimate the state of the channel from the user j in the cell 1. Furthermore, the user equipment j in the cell 2 transmits a training sequence for the base station 1 and the base station 2 to estimate the state of the channel from the user j in the cell 2. Furthermore, the user equipment i1 in the cell 1 also transmits a training sequence for the user equipment i2 estimating the state of the channel from the user equipment i1.

In step S507, the base station 1, the base station 2, and the user equipment i2 perform channel estimation based on the received training sequences. Specifically, each of the base station 1 and the base station 2 estimates the state information of the channel from the user j in the cell 1 and the channel from the user j in the cell 2, and the user equipment i2 estimates the state information of the channel from the user equipment i1 and the channel from the user equipment j in the cell 1.

In step S508, the base station 1 and the base station 2 exchange the respective estimated channel state information with each other, and exchange waveform information of the respective managed user equipments j. Specifically, the base station 1 notifies the base station 2 of the waveform information reported by the user equipment j in the cell 1, and the base station 2 notifies the base station 1 of the waveform information reported by the user equipment j in the cell 2.

Thus, the base station 1 and the base station 2 obtain the matrix F and matrix H in equations (9) and (10), and thus can determine the channel matrices $\tilde{H}_{1,(i,j)}$, $\tilde{H}_{1,(2,j)}$, $\tilde{H}_{2,(1,j)}$, $\tilde{H}_{2,(2,j)}$ according to equations (9) and (10), further determine the equivalent channel matrices $G_{1,(1,j)}$, $G_{1,(2,j)}$, $G_{2,(1,j)}$, $G_{2,(2,j)}$ according to equation (12), and obtain the precoding matrices $P_{(1,j)}$ and $P_{(2,j)}$ for the user equipment j in the cell 1 and the user equipment j in the cell 2 according to equation (13), as shown in step S509.

Then, in step S510, the base station 1 transmits the obtained precoding matrix $P_{(1,j)}$ for the user equipment j in the cell 1 to the user equipment j in the cell 1, and transmits the precoding matrix to the user equipment i2 in the cell 1. The base station 2 transmits the obtained precoding matrix $P_{(2,j)}$ for the user equipment j in the cell 2 to the user equipment j in the cell 2. For example, the base station 1 and the base station 2 may only transmit precoding matrix indices. Subsequently, the user equipment j in the cell 1 and user equipment j in the cell 2 can transmit signals using the received precoding matrix (not shown).

In step S511, the base station 1 further transmits the waveform parameter of the user equipment j in the cell 1 to the user equipment i2 in the cell 1. It should be noted that, in the present invention, the base station 1 is not limited to notifying the user equipment i2 of the waveform parameter of the user equipment j at this time, but may also notify, before this step, the user equipment i2 of the waveform parameter reported by the user equipment j in the cell 1 at any time after receiving the waveform parameter.

So far, the user equipment i2 in the cell 1 obtains the matrix F and matrix H in the equation (11), and thus can determine the channel matrices $\tilde{H}_{(1,i2),(1,j)}$, $\tilde{H}_{(1,i2),(1,i1)}$ according to the equation (11), and further determine the equivalent channel matrices $G_{(1,i2),(1,j)}$, $G_{(1,i2),(1,i1)}$ according to the equation (12). Since the base station 1 also notifies the user equipment i2 of the precoding matrix $P_{(1,j)}$ determined for the user equipment j in the cell 1 in step S510, the user equipment i2 can obtain the precoding matrix $P_{(1,i1)}$ for the user equipment i1 according to equation (14), as shown in Step S512.

Subsequently, the user equipment i2 feeds back the obtained precoding matrix $P_{(1,i1)}$ to the user equipment i1 in step S513. Thus, the user equipment i1 can transmit signals to the user equipment i2 using the received precoding matrix $P_{(1,i1)}$ (not shown).

Figure 6:
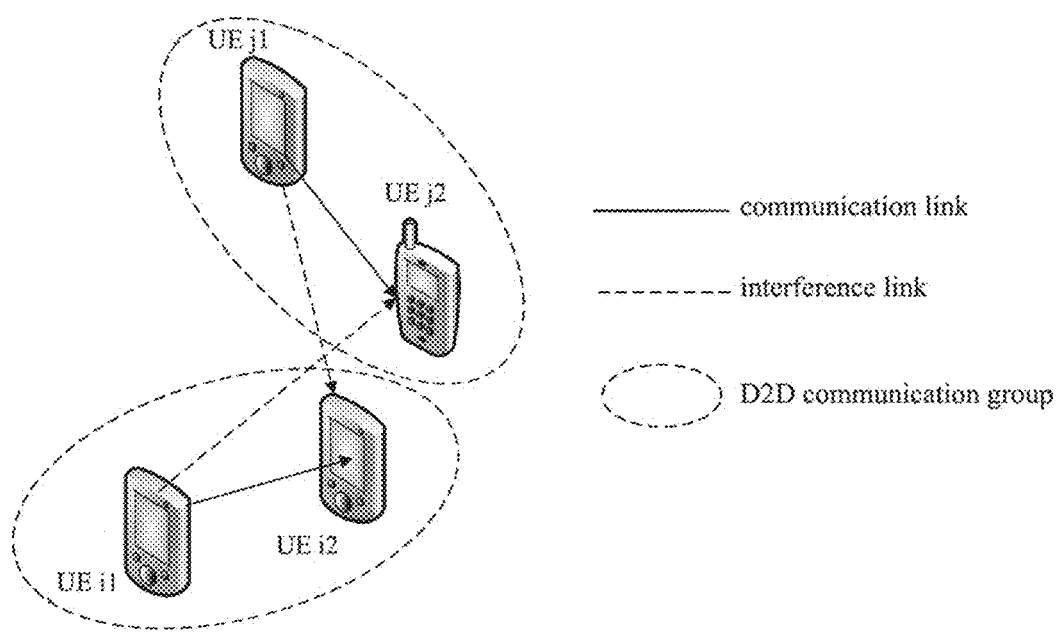
FIG. 6 schematically shows a communication scenario in which interference exists according to a third embodiment of the present invention.

FIG. 6 shows a scenario in which interference exists between D2D communication user groups outside the coverage of the base station according to the third embodiment of the present invention. As shown in FIG. 6, the user equipment i1 (UE i1) and the user equipment i2 (UE i2) are a group of user equipments that perform the D2D communication, and the user equipment j1 (UE j1) and user equipment j2 (UE j2) are another group of user equipments that perform the D2D communication. Two groups of user equipments operate in the same frequency band, and thus interfere with each other.

As in the first embodiment, in the present embodiment, the interference exists between two groups of user equipments that perform the D2D communication, and thus the frequency domain precoding matrix can be determined for the transmitting devices (the user equipments i1, j1) in each group of user equipments based on equations (1)-(6) in the manner as described in the first embodiment.

This embodiment is different from the first embodiment in that, the two groups of user equipments are located outside the coverage of the base station, and there is no base station in the communication scenario. Therefore, the signaling interaction procedure is different from the first embodiment.

Figure 7:
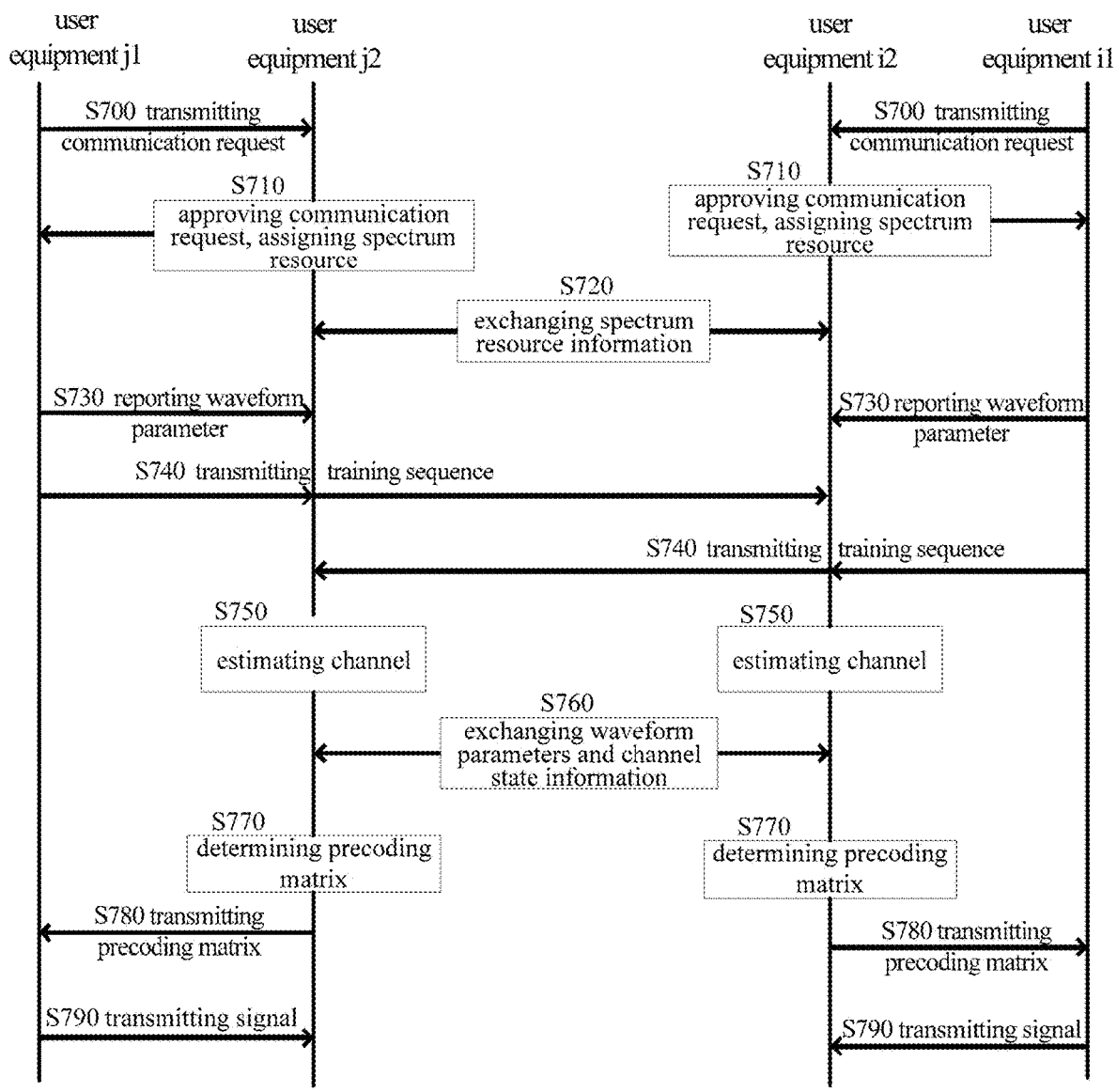
FIG. 7 shows a signaling interaction diagram of an interference cancellation scheme according to a third embodiment of the present invention.

FIG. 7 shows a signaling interaction diagram of a scheme for eliminating the interference between two groups of user equipments in the scenario shown in FIG. 6.

As shown in FIG. 7, in step S700, the user equipment i1 transmits a D2D communication request to the user equipment i2, and the user equipment j1 transmits a D2D communication request to the user equipment j2.

In step S710, the user equipment i2 and the user equipment j2 approve the D2D communication request, and assign spectrum resources to the user equipment i1 and the user equipment j1, respectively.

Subsequently, the user equipment i2 and the user equipment j2 notify each other of the assigned spectrum resources, as shown in step S720. Considering the case where the spectrum resources assigned by the user equipment i2 and the user equipment j2 are the same, there is interference between the two groups of user equipments at this time, and thus the user equipment i2 and the user equipment j2 instruct the user equipment i1 and the user equipment j1 to perform interference cancellation.

In response to the instruction of the user equipment i2 and the user equipment j2, the user equipment i1 and the user equipment j1 respectively transmit their own waveform parameters to the user equipment i2 and the user equipment j2 in step S730.

Subsequently, in step S740, the user equipment i1 transmits a training sequence for the user equipment i2 and the user equipment j2 estimating the state of the channel from the user equipment i1. Likewise, the user equipment j1 transmits a training sequence for the user equipment i2 and user equipment j2 estimating the channel from the user j1.

The user equipment i2 estimates the state information of the channels from the user equipments i1 and j1 based on the received training sequences from the user equipments i1 and j1. Likewise, the user equipment j2 estimates the state information of the channels from the user equipments i1 and j based on the received training sequence, as shown in step S750.

The user equipment i2 and the user equipment j2 mutually exchange the received waveform parameters and the respective estimated channel state information in step S760. Specifically, the user equipment i2 transmits the waveform parameter of the user equipment i1 and the channel state information estimated by the user equipment i2 to the user equipment j2, and the user equipment j2 transmits the waveform parameter of the user equipment j1 and the channel state information estimated by the user equipment j2 to the user equipment i2.

So far, the user equipment i2 and the user equipment j2, as receiving devices, have obtained the matrix F and matrix H in the equations (3) and (4), and thus can determine the channel matrix $\tilde{H}$, and further determine the equivalent channel matrix G according to the equation (5), and calculate the precoding matrices $P_{i1}$ and $P_{j1}$ for the transmitting devices i1, j1 according to equation (6), as shown in step S770.

Then, in step S780, the user equipment i2 and the user equipment j2 respectively transmit the calculated frequency domain precoding matrix to the user equipment i1 and the user equipment j1. For example, the user equipment i2 and user equipment j2 may transmit precoding matrix indices. Subsequently, the user equipment i1 and the user equipment j1 use the precoding matrix to transmit a signal in step S790.

The interference cancellation scheme of the present invention has been described above with respect to new waveforms based on time domain filtering (e.g., UFMC) in connection with FIGS. 2 through 7. However, the present invention is equally applicable to the conventional waveform. When applied to the conventional waveform, the waveform parameters will not be considered. For example, in the case of CP-OFDM, since there is no filter for each subband, the above filter coefficient matrix F can be replaced with a cyclic prefix added matrix. The cyclic prefix added matrix can be expressed as:

$$T_{j1} = \begin{bmatrix} 0\ 0\ \ldots\ I_{N_{cp}} \\ I_N \end{bmatrix}_{(N+N_{cp}) \times N} \quad (18)$$

where $I_N$ represents a unit matrix with rank N, and $N_{cp}$ represents length of the cyclic prefix.

Except for this, the manner of calculating the precoding matrix and the signaling flow among devices are the same as those described above. Therefore, the solution of the present invention can be applied to interference cancellation in a communication scenario where new waveform and conventional waveform coexist, and has a good backward compatibility.

Furthermore, the present invention can also be applicable to hybrid single carrier technology and multi-carrier technology. Taking the interference cancellation between groups of D2D user equipments in the first embodiment as an example, it is assumed that the user equipments i1 and i2 use UFMC, while the user equipments j1 and j2 use DFT-S-OFDM. In frequency domain, the signals received by the user equipment i2 and the user equipment j2 can be expressed as:

where $T_{j1}$ represents the cyclic prefix added matrix. The length of the cyclic prefix is set to $L_{FIR}-1$ herein. In addition, $X_{i1}=P_{i1}W(N_1)s_{i1}$, where $s_{i1}$ represents time domain information of the user i1; $X_{j1}=P_{j1}W(N_1)s_{j1}$ where $s_{j1}$ represents time domain information of the user j1.

Subsequently, the precoding matrices $P_{i1}$ and $P_{j1}$ can be determined according to the method in the first embodiment.

The interference cancellation scheme proposed by the present invention has been described above in connection with various embodiments. This scheme takes into account the characteristics of new waveforms oriented to future mobile communication in determination of the precoding matrix, and thus the precoding matrix can be used to enable the useful signal space and the interference signal space to be orthogonal to each other, thereby achieving better effects in interference cancellation. In addition, through the precoding process, the scheme of the present invention can effectively reduce interference caused by different frequency offsets of users. Furthermore, the scheme of the present invention can also be applied to the conventional waveforms, and therefore has a good backward compatibility.

The present invention can be applied to various products. For example, the base station in the above embodiments may include any type of evolved Node B (eNB), such as macro eNB and small eNB. The small eNB may be an eNB covering a cell smaller than the macro cell, such as pico eNB, micro eNB and home (femto) eNB. Alternatively, the network side device or base station may also include any other types of base stations, such as NodeB and base transceiver station (BTS). The base station can include: a body (also referred to as a base station device) configured to control wireless communication; and one or more remote wireless headends (RRHs) disposed at a different location than the body. In addition, various types of terminal devices can also operate as base stations by performing base station functions temporarily or semi-persistently.

On the other hand, the user equipment in the above embodiment may be implemented, for example, as a communication terminal device (such as smart phone, tablet personal computer (PC), notebook PC, portable game terminal, portable/dongle type mobile router and digital camera device) or an in-vehicle terminal device (such as car navigation device), and may also be implemented as a terminal device that performs machine-to-machine (M2M) communication, which is also referred to as a machine type communication (MTC) terminal device. Further, the terminal (19)

$$R_{i2} = \underbrace{[W(2N)]_{1:2N_1} \Omega_r H_{i2,i1} D(\varepsilon_{i2,i1}, N + L_{FIR} - 1) F_{i1} [W(N)]^H_{i:N_1}}_{\triangleq \tilde{H}_{i2,i1}} X_{i1} +$$

$$\underbrace{[W(2N)]_{1:2N_1} \Omega_r H_{i2,j1} D(\varepsilon_{i2,j1}, N + L_{FIR} - 1) T_{j1} [W(N)]^H_{i:N_1}}_{\triangleq \tilde{H}_{i2,j1}} X_{j1} + Z_{i2}2$$

(20)

$$R_{j2} = \underbrace{[W(2N)]_{1:2N_1} \Omega_r H_{j2,i1} D(\varepsilon_{j2,i1}, N + L_{FIR} - 1) F_{j1} [W(N)]^H_{i:N_1}}_{\triangleq \tilde{H}_{j2,i1}} X_{i1} +$$

$$\underbrace{[W(2N)]_{1:2N_1} \Omega_r H_{j2,j1} D(\varepsilon_{j2,j1}, N + L_{FIR} - 1) T_{j1} [W(N)]^H_{i:N_1}}_{\triangleq \tilde{H}_{j2,j1}} X_{j1} + Z_{j2}$$

device or user equipment may also be a wireless communication module (such as integrated circuit module containing a single chip) installed on each of the above terminals.

The implementation of a terminal device or user equipment is described below with reference to FIG. 8 with a smartphone as an example.

Figure 8:
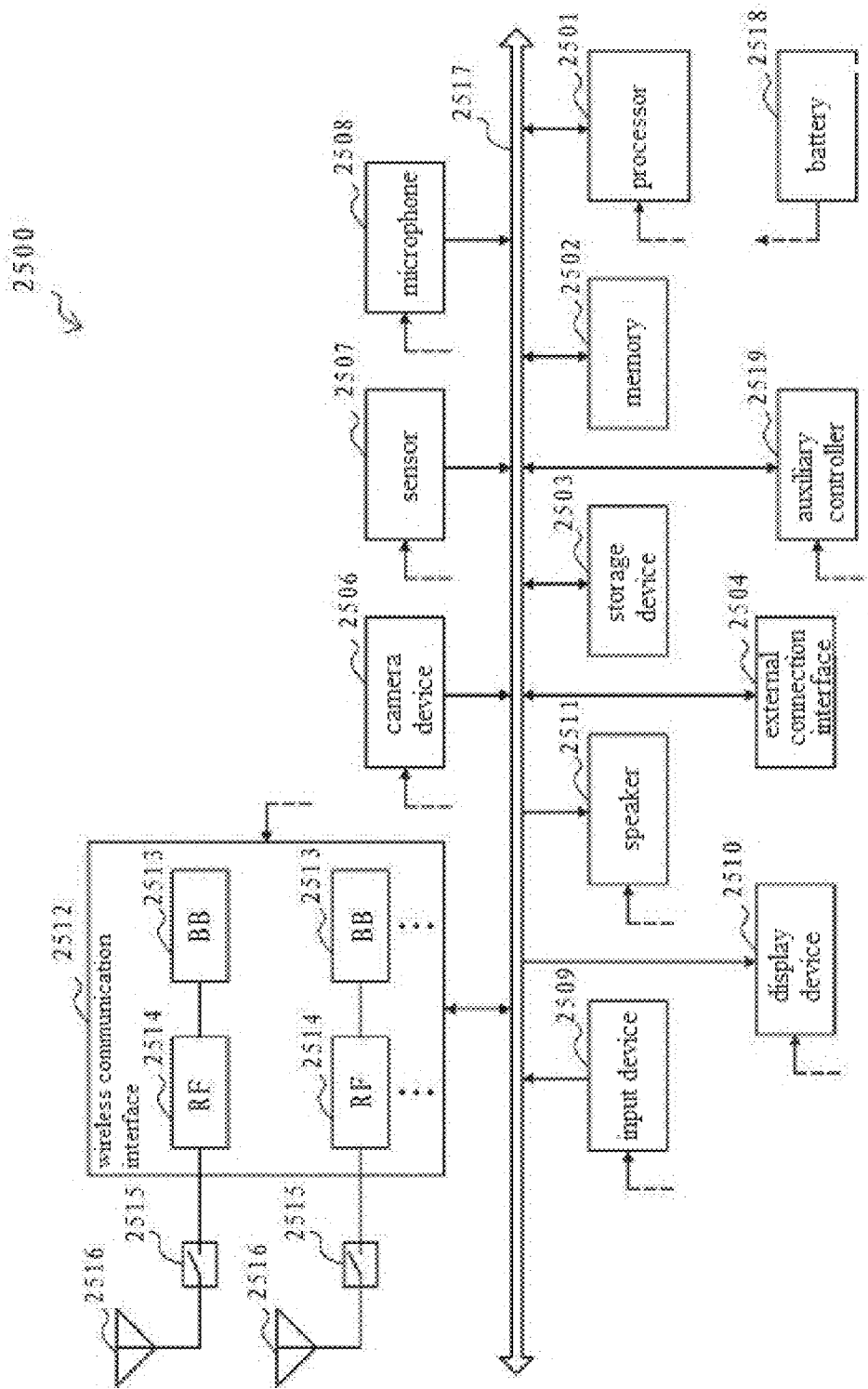
FIG. 8 shows a block diagram of schematic configuration of a smartphone as one example of a user equipment.

FIG. 8 shows a block diagram of a schematic configuration of a smartphone. As shown in FIG. 8, the smart phone 2500 includes a processor 2501, a memory 2502, a storage device 2503, an external connection interface 2504, a camera device 2506, a sensor 2507, a microphone 2508, an input device 2509, a display device 2510, a speaker 2511, and a wireless communication interface 2512, one or more antenna switches 2515, one or more antennas 2516, a bus 2517, a battery 2518, and an auxiliary controller 2519.

The processor 2501 may be, for example, a CPU or a system on chip (SoC), and controls the functions of the application layer and the other layers of the smartphone 2500. The memory 2502 includes a RAM and a ROM, and stores data and programs executed by the processor 2501. The storage device 2503 may include a storage medium such as semiconductor memory and hard disk. The external connection interface 2504 is an interface for connecting an external device (such as memory card and universal serial bus (USB) device) to the smartphone 2500.

The camera device 2506 includes an image sensor (such as charge coupled device (CCD) and complementary metal oxide semiconductor (CMOS)), and generates a captured image. The sensor 2507 can include a set of sensors, such as measurement sensor, gyro sensor, geomagnetic sensor and acceleration sensor. The microphone 2508 converts the sound input to the smartphone 2500 into an audio signal. The input device 2509 includes, for example, a touch sensor, a keypad, a keyboard, a button, or a switch configured to detect a touch on the screen of the display device 2510, and receives an operation or information input from a user. The display device 2510 includes screens (such as liquid crystal display (LCD) and organic light emitting diode (OLED) display), and displays an output image of the smartphone 2500. The speaker 2511 converts the audio signal output from the smartphone 2500 into a sound.

The wireless communication interface 2512 supports any cellular communication scheme (such as LTE and LTE-Advanced) and performs wireless communication. The wireless communication interface 2512 may generally include, for example, a baseband (BB) processor 2513 and a radio frequency (RF) circuit 2514. The BB processor 2513 can perform, for example, encoding/decoding, modulation/demodulation, and multiplexing/demultiplexing, and performs various types of signal processing for wireless communication. Meanwhile, the RF circuit 2514 may include, for example, a mixer, a filter, and an amplifier, and transmits and receives a wireless signal via the antenna 2516. The wireless communication interface 2512 may be a chip module on which the BB processor 2513 and the RF circuit 2514 are integrated. As shown in FIG. 8, the wireless communication interface 2512 can include a plurality of BB processors 2513 and a plurality of RF circuits 2514. However, the wireless communication interface 2512 can also include a single BB processor 2513 or a single RF circuit 2514.

Further, in addition to the cellular communication scheme, the wireless communication interface 2512 can support other types of wireless communication schemes, such as short-range wireless communication scheme, near field communication scheme, and wireless local area network (LAN) scheme. In this case, the wireless communication interface 2512 can include a BB processor 2513 and a RF circuit 2514 for each wireless communication scheme.

Each of the antenna switches 2515 switches the connection destination of the antenna 2516 between a plurality of circuits (such as circuits for different wireless communication schemes) included in the wireless communication interface 2512.

Each of the antennas 2516 includes a single or multiple antenna elements (such as multiple antenna elements included in a MIMO antenna) and is used by the wireless communication interface 2512 to transmit and receive wireless signals. As shown in FIG. 8, the smart phone 2500 can include multiple antennas 2516. However, the smart phone 2500 can also include a single antenna 2516.

In addition, the smart phone 2500 can include an antenna 2516 for each wireless communication scheme. In this case, the antenna switch 2515 can be omitted from the configuration of the smartphone 2500.

The bus 2517 connects the processor 2501, the memory 2502, the storage device 2503, the external connection interface 2504, the camera device 2506, the sensor 2507, the microphone 2508, the input device 2509, the display device 2510, the speaker 2511, the wireless communication interface 2512, and the auxiliary controller 2519 to each other. The battery 2518 provides power to various components of the smart phone 2500 via feeders, which are shown partially as dashed lines in the figure. The auxiliary controller 2519 operates the minimum required function of the smartphone 2500, for example, in a sleep mode.

In the smartphone 2500 shown in FIG. 8, the transceiver of the terminal device can be implemented by the wireless communication interface 2512. At least a portion of functions of the respective functional units of the terminal device may also be implemented by the processor 2501 or the auxiliary controller 2519. For example, the power consumption of the battery 2518 can be reduced by performing a portion of functions of the processor 2501 by the auxiliary controller 2519. Further, the processor 2501 or the auxiliary controller 2519 can perform at least a part of functions of the respective functional units of the terminal device by executing the program stored in the memory 2502 or the storage device 2503.

The implementation of the base station is described below with reference to FIG. 9 with the eNB as an example.

Figure 9:
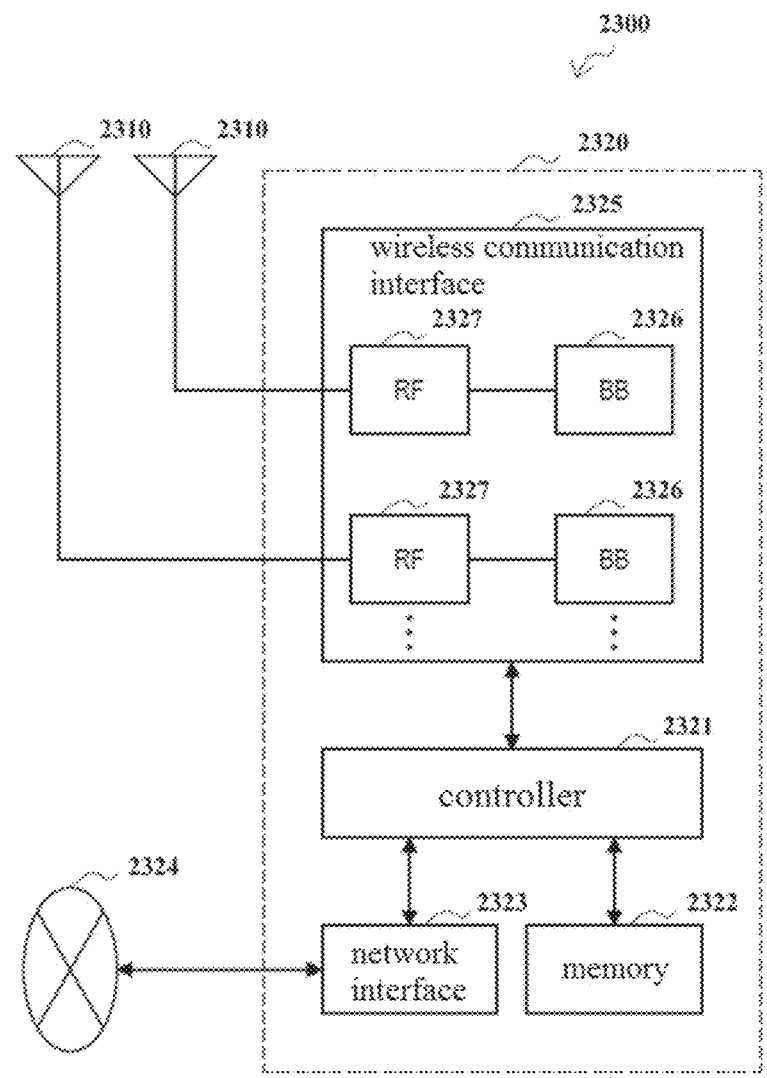
FIG. 9 shows a block diagram of a schematic configuration of an eNB as one example of a base station.

FIG. 9 shows a block diagram of a schematic configuration of an eNB. As shown in FIG. 9, the eNB 2300 includes one or more antennas 2310 and a base station device 2320. The base station device 2320 and each antenna 2310 may be connected to each other via a radio frequency (RF) cable.

Each of the antennas 2310 includes a single or multiple antenna elements (such as multiple antenna elements included in a multiple input multiple output (MIMO) antenna), and is used by the base station device 2320 to transmit and receive wireless signals. As shown in FIG. 9, the eNB 2300 may include multiple antennas 2310. For example, the multiple antennas 2310 can be compatible with the multiple frequency bands used by the eNB 2300. Although FIG. 9 illustrates an example in which the eNB 2300 includes multiple antennas 2310, the eNB 2300 may also include a single antenna 2310.

The base station device 2320 includes a controller 2321, a memory 2322, a network interface 2323, and a wireless communication interface 2325.

The controller 2321 may be, for example, a CPU or a DSP, and operates various functions of higher layers of the base station device 2320. For example, the controller 2321 generates data packets based on data in signals processed by the wireless communication interface 2325 and delivers the generated packets via the network interface 2323. The controller 2321 can bundle data from a plurality of baseband processors to generate bundled packets and deliver the generated bundled packets. The controller 2321 may have a logical function that performs control such as radio resource control, radio bearer control, mobility management, admission control, and scheduling. This control can be performed in conjunction with nearby eNBs or core network nodes. The memory 2322 includes a RAM and a ROM, and stores programs executed by the controller 2321 and various control data (such as terminal list, transmission power data, and scheduling data).

The network interface 2323 is a communication interface for connecting the base station device 2320 to the core network 2324. The controller 2321 can communicate with a core network node or another eNB via the network interface 2323. In this case, the eNB 2300 and the core network node or other eNBs may be connected to each other through a logical interface (such as S1 interface and X2 interface). The network interface 2323 can also be a wired communication interface or a wireless communication interface for wireless backhaul lines. If the network interface 2323 is a wireless communication interface, the network interface 2323 can use a higher frequency band for wireless communication than the frequency band used by the wireless communication interface 2325.

The wireless communication interface 2325 supports any cellular communication schemes (such as Long Term Evolution (LTE) and LTE-Advanced), and provides wireless connection to terminals located in cells of the eNB 2300 via the antenna 2310. The wireless communication interface 2325 can typically include, for example, a BB processor 2326 and a RF circuit 2327. The BB processor 2326 can perform, for example, encoding/decoding, modulation/demodulation, and multiplexing/demultiplexing, and performs various types of signal processing of layers (for example, L, Medium Access Control (MAC), Radio Link Control (RLC), and Packet Data Convergence Protocol (PDCP)). Instead of the controller 2321, the BB processor 2326 may have some or all of the above described logic functions. The BB processor 2326 can be a memory that stores a communication control program, or a module that includes a processor and associated circuits configured to execute the program. The update program can cause the functionality of the BB processor 2326 to change. The module can be a card or blade that is inserted into the slot of the base station device 2320. Alternatively, the module can also be a chip mounted on a card or blade. Meanwhile, the RF circuit 2327 may include, for example, a mixer, a filter, and an amplifier, and transmits and receives a wireless signal via the antenna 2310.

As shown in FIG. 9, the wireless communication interface 2325 can include multiple BB processors 2326. For example, the multiple BB processors 2326 can be compatible with multiple frequency bands used by the eNB 2300. As shown in FIG. 9, the wireless communication interface 2325 can include multiple RF circuits 2327. For example, the multiple RF circuits 2327 can be compatible with multiple antenna elements. Although FIG. 9 illustrates an example in which the wireless communication interface 2325 includes multiple BB processors 2326 and multiple RF circuits 2327, the wireless communication interface 2325 may also include a single BB processor 2326 or a single RF circuit 2327.

In the eNB 2300 shown in FIG. 9, the transceiver of the base station side device can be implemented by the wireless communication interface 2325. At least a portion of functionality of the respective units may also be performed by the controller 2321. For example, the controller 2321 can perform at least a portion of functionality of the respective units by executing a program stored in the memory 2322.

A series of processes performed by each device or component in the above embodiments may be implemented by software, hardware, or a combination of software and hardware. The program included in the software may be stored in advance in, for example, the storage medium provided inside or outside each device or component. As an example, during execution, these programs are written to a random access memory (RAM) and executed by a processor (e.g., a CPU) to perform the various processes described in the above embodiments.

Figure 10:
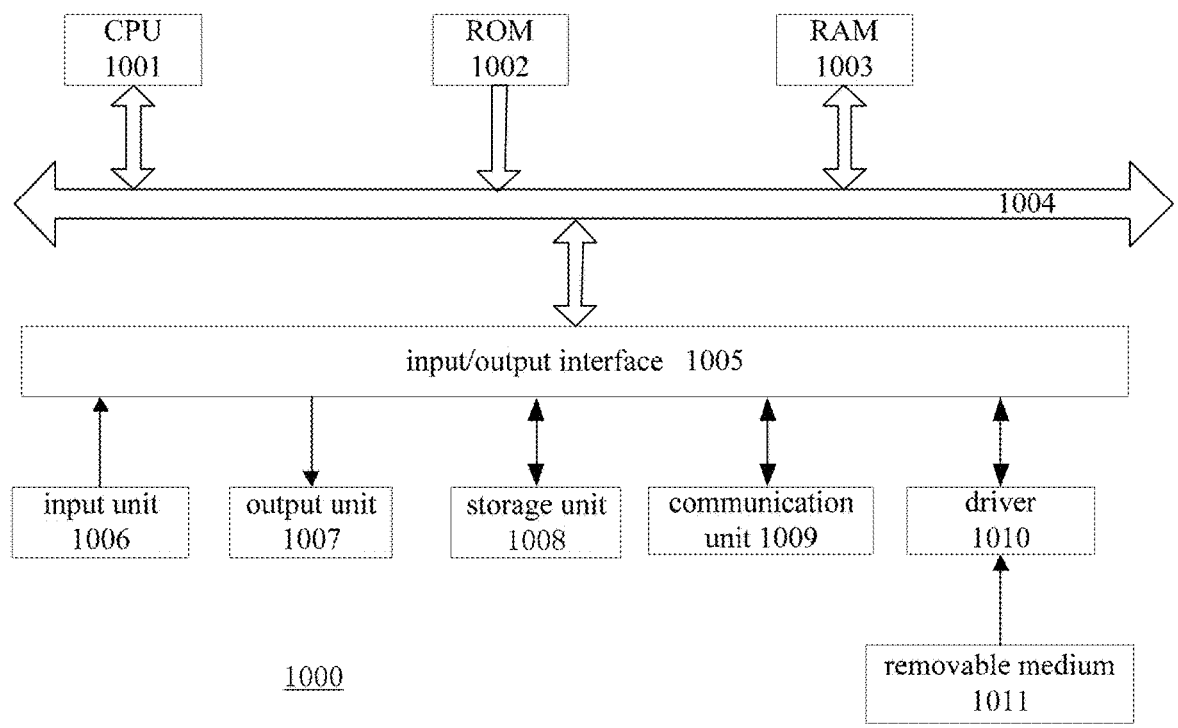
FIG. 10 shows a block diagram of schematic configuration of computer hardware.

FIG. 10 is a block diagram showing an example configuration of computer hardware that executes the scheme of the present invention in accordance with a program.

In the computer 1000, a central processing unit (CPU) 1001, a read only memory (ROM) 1002, and a random access memory (RAM) 1003 are connected to one another via a bus 1004.

The input/output interface 1005 is further connected to the bus 1004. The input/output interface 1005 is connected to the following components: an input unit 1006 formed of a keyboard, a mouse, a microphone, or the like; an output unit 1007 formed of a display, a speaker, or the like; a storage unit 1008 formed of a hard disk, a non-volatile memory, or the like; a communication unit 1009 formed of a network interface card (such as local area network (LAN) card, modem, etc.); and a driver 1010 that drives the removable medium 1011 such as magnetic disk, optical disk, magneto-optical disk or semiconductor memory.

In the computer having the above configuration, the CPU 1001 loads the program stored in the storage unit 1008 into the RAM 1003 via the input/output interface 1005 and the bus 1004, and executes the program to execute the above processing.

The program to be executed by a computer (CPU 1001) may be recorded on a removable medium 1011 as a package medium formed by, for example, a magnetic disk (including a floppy disk), an optical disk (including a compact disk-read only memory (CD-ROM), a digital versatile disk (DVD), etc.), a magneto-optical disk, or a semiconductor memory. Further, the program to be executed by a computer (CPU 1001) can also be provided via a wired or wireless transmission medium such as local area network, the Internet or digital satellite broadcasting.

When the removable medium 1011 is installed in the driver 1010, the program can be installed in the storage unit 1008 via the input/output interface 1005. In addition, the program can be received by the communication unit 1009 via a wired or wireless transmission medium, and the program is installed in the storage unit 1008. Alternatively, the program may be pre-installed in the ROM 1002 or the storage unit 1008.

The program to be executed by the computer may be a program that performs processing in accordance with the order described in this specification, or may be a program that performs processing in parallel or when needed (e.g. when called).

The various devices or units described herein are only logical and do not strictly correspond to physical devices or entities. For example, the functionality of each unit described herein may be implemented by multiple physical entities, or the functionality of the multiple units described herein may be implemented by a single physical entity. In addition, it should be noted that the features, components, elements, steps, and the like described in one embodiment are not limited to the embodiment, but may be applied to other embodiments, for example, in place of or in combination with specific features, components, elements, steps, and the like in other embodiments.

The embodiments and technical effects of the present invention have been described in detail above with reference to the accompanying drawings, but the scope of the present invention is not limited thereto. It will be appreciated by those skilled in the art that, depending on the design requirements and other factors, various modifications and changes can be made to the embodiments discussed herein without departing from the spirit and scope of the invention. The scope of the invention is defined by the appended claims or their equivalents.

Further, the present invention can also be configured as follows.

An electronic device for performing wireless communication with two groups of communication devices, the electronic device comprises a processing circuitry configured to: obtain a first waveform parameter relating to the first group of communication devices, the first waveform parameter is related to formation of a signal waveform for communication of the first group of communication devices; and notify the second group of communication devices of the first waveform parameter, such that the second group of communication devices can determine a precoding matrix for communication of the second group of communication devices based on the first waveform parameter.

Wherein the first group of communication devices in the two groups of communication devices comprise a first communication device and a second communication device, and the second group of communication devices comprise a third communication device and a fourth communication device, the processing circuitry being further configured to: obtain the first waveform parameter relating to formation of a signal waveform transmitted by the first communication device; and notify the fourth communication device of the first waveform parameter, such that the fourth communication device can determine a precoding matrix to be used by the third communication device based on the first waveform parameter.

The processing circuitry is further configured to: obtain channel state information estimated by the second communication device; and notify the fourth communication device of the obtained channel state information, such that the fourth communication device can determine the precoding matrix to be used by the third communication device based on the channel state information.

Wherein the channel state information estimated by the second communication device comprises channel state information for a channel between the first communication device and the second communication device, and channel state information for a channel between the third communication device and the second communication device.

Wherein the precoding matrix is used for precoding a signal to be transmitted by the third communication device, so as to eliminate interference.

The processing circuitry is further configured to: obtain a second waveform parameter relating to the second group of communication devices, the second waveform parameter is related to formation of a signal waveform for communication of the second group of communication devices; and notify the first group of communication devices of the second waveform parameter, such that the first group of communication devices can determine a precoding matrix for communication of the first group of communication devices based on the second waveform parameter.

The processing circuitry is further configured to: assign same communication resource to the two groups of communication devices; and instruct the two groups of communication devices to report the first waveform parameter and the second waveform parameter respectively.

Wherein the first waveform parameter comprises one or more of multi carrier filter type, filter length, filter out-band attenuation, transform length of fast Fourier transform/inverse fast Fourier transform (FFT\IFFT), carrier interval, number of data streams being transmitted in parallel, and length of discrete Fourier transform (DFT) extension.

Wherein the signal waveform comprises one or more of Universal filtered multicarrier (UFMC), cyclic prefix-orthogonal frequency division multiplexing (CP-OFDM) with weighted overlap-add (WOLA), flexible cyclic prefix-orthogonal frequency division multiplexing (FCP-OFDM), filtered-orthogonal frequency division multiplexing (F-OFDM), cyclic prefix-orthogonal frequency division multiplexing, discrete Fourier transform-spread-orthogonal frequency division multiplexing (DFT-S-OFDM).

A second communication device in a first group of communication devices in a communication system, the communication system comprises the first group of communication devices and a second group of communication devices, the second communication device comprises a processing circuitry configured to: determine a precoding matrix for communication of the first group of communication devices based on a first waveform parameter relating to the first group of communication devices and a second waveform parameter relating to the second group of communication devices, wherein the first waveform parameter is related to formation of a signal waveform for communication of the first group of communication devices, and the second waveform parameter is related to formation of a signal waveform for communication of the second group of communication devices.

Wherein the first group of communication devices comprise a first communication device and a second communication device, and the second group of communication decides comprise a third communication device and a fourth communication device, the processing circuitry being further configured to: determine the precoding matrix to be used by the first communication device based on the first waveform parameter relating to formation of a signal waveform transmitted by the first communication device and the second waveform parameter relating to formation of a signal waveform transmitted by the third communication device.

Wherein the processing circuitry is further configured to: estimate channel state information of a channel between the first communication device and the second communication device, and channel state information of a channel between the third communication device and the second communication device.

The processing circuitry is further configured to: determine the precoding matrix to be used by the first communication device based on the channel state information estimated by the processing circuitry and channel state information estimated by the fourth communication device in the second group of communication devices.

The processing circuitry is further configured to: generate a precoding matrix index based on the determined precoding matrix to transmit to the first communication device.

A communication method in a communication system, said communication system comprising a base station, a first group of communication devices consisting of a first communication device and a second communication device, and a second group of communication devices consisting of a third communication device and a fourth communication device, said method comprising: reporting, by the first communication device in the first group of communication devices, a waveform parameter to the base station, the waveform parameter is related to formation of a signal waveform transmitted by the first communication device; reporting, by the second communication device in the first group of communication devices, channel state information estimated by the second communication device to the base station; notifying, by the base station, the fourth communication device in the second group of communication devices of the waveform parameter and the channel state information obtained from the first group of communication devices; and determining, by the fourth communication device, a precoding matrix for the third communication device in the second group of communication devices, based on a waveform parameter of the third communication device, channel state information estimated by the fourth communication device, and the waveform parameter and the channel state information of the first group of communication devices obtained from the base station.

A base station device in a communication system, comprising a processing circuitry configured to: determine a precoding matrix to be used by a first terminal device served by the base station device based on a first waveform parameter of the first terminal device and a second waveform parameter of a second terminal device served by a neighboring base station, wherein the first waveform parameter is related to formation of a signal waveform transmitted by the first terminal device, and the second waveform parameter is related to formation of a signal waveform transmitted by the second terminal device.

The processing circuitry is further configured to: estimate channel state information; and determine the precoding matrix to be used by the first terminal device based on the estimated channel state information and channel state information estimated by the neighboring base station.

Wherein the channel state information estimated by the processing circuitry comprises channel state information of a channel between the first terminal device and the base station device, and channel state information of a channel between the second terminal device and the base station device.

The processing circuitry is further configured to: generate a precoding matrix index based on the determined precoding matrix to transmit to the first terminal device, wherein the precoding matrix is used for precoding a signal to be transmitted by the first terminal device, so as to eliminate interference.

The processing circuitry is further configured to: notify a second communication device in a group of communication devices managed by the base station device of the first waveform parameter of the first terminal device, such that the second communication device can determine a precoding matrix to be used by a first communication device in the group of communication devices based on the first waveform parameter.

The processing circuitry is further configured to: assign to the first terminal device and the group of communication devices same communication resource as those assigned to the second terminal device by the neighboring base station; instruct the first terminal device to report the first waveform parameter; and instruct the first communication device to transmit a waveform parameter of the first communication device to the second communication device.

A second communication device in a group of communication devices, said group of communication devices comprising a first communication device and a second communication device in communication with each other, said second communication device comprising a processing circuitry configured to: determine a precoding matrix to be used by the first communication device based on a first waveform parameter of the first communication device and a second waveform parameter of a terminal device served by a base station which is obtained from the base station, wherein the first waveform parameter is related to formation of a signal waveform transmitted by the first communication device, and the second waveform parameter is related to formation of a signal waveform transmitted by the terminal device.

The processing circuitry is further configured to: estimate channel state information of a channel between the first communication device and the second communication device, and channel state information of a channel between the terminal device and the second communication device.

Wherein the processing circuitry is further configured to: determine the precoding matrix to be used by the first communication device based on the estimated channel state information.

A communication method in a communication system, said method comprising: obtaining, by a base station, a first waveform parameter of a first terminal device served by the base station; obtaining, by the base station, a second waveform parameter of a second terminal device served by a neighboring base station from the neighboring base station; and determining, by the base station, a precoding matrix to be used by the first terminal device based on the first waveform parameter and the second waveform parameter, wherein the first waveform parameter is related to formation of a signal waveform transmitted by the first terminal device, and the second waveform parameter is related to formation of a signal waveform transmitted by the second terminal device.

The method further comprises: estimating, by the base station, channel state information; obtaining, by the base station, channel state information estimated by the neighboring base station from the neighboring base station; and determining, by the base station, the precoding matrix to be used by the first terminal device based on the estimated channel state information and the obtained channel state information.

The method further comprises: transmitting, by the base station, the first waveform parameter of the first terminal device to a second communication device in a group of communication devices managed by the base station; obtaining, by the second communication device, a third waveform parameter of a first communication device in the group of communication devices, wherein the third waveform parameter is related to formation of a signal waveform transmitted by the first communication device; and determining, by the second communication device, a precoding matrix to be used by the first communication device based on the first waveform parameter and the third waveform parameter.

The invention claimed is:
1. An electronic device for performing wireless communication with two groups of communication devices, wherein the electronic device comprises a processing circuitry configured to:
obtain a first waveform parameter relating to the first group of communication devices, wherein the first waveform parameter is related to formation of a signal waveform for communication of the first group of communication devices; and
notify the second group of communication devices of the first waveform parameter, such that the second group of communication devices can determine a precoding matrix for communication of the second group of communication devices based on the first waveform parameter.

2. The electronic device according to claim 1, wherein the first group of communication devices in the two groups of communication devices comprise a first communication device and a second communication device, and the second group of communication devices comprise a third communication device and a fourth communication device, the processing circuitry being further configured to:
obtain the first waveform parameter relating to formation of a signal waveform transmitted by the first communication device; and
notify the fourth communication device of the first waveform parameter, such that the fourth communication device can determine a precoding matrix to be used by the third communication device based on the first waveform parameter.

3. The electronic device according to claim 2, wherein the processing circuitry is further configured to:
obtain channel state information estimated by the second communication device; and
notify the fourth communication device of the obtained channel state information, such that the fourth communication device can determine the precoding matrix to be used by the third communication device based on the channel state information.

4. The electronic device according to claim 3, wherein the channel state information estimated by the second communication device comprises channel state information for a channel between the first communication device and the second communication device, and channel state information for a channel between the third communication device and the second communication device.

5. The electronic device according to claim 2, wherein the precoding matrix is used for precoding a signal to be transmitted by the third communication device, so as to eliminate interference.

6. The electronic device according to claim 1, wherein the processing circuitry is further configured to:
obtain a second waveform parameter relating to the second group of communication devices, wherein the second waveform parameter is related to formation of a signal waveform for communication of the second group of communication devices; and
notify the first group of communication devices of the second waveform parameter, such that the first group of communication devices can determine a precoding matrix for communication of the first group of communication devices based on the second waveform parameter.

7. The electronic device according to claim 6, wherein the processing circuitry is further configured to:
assign same communication resource to the two groups of communication devices; and
instruct the two groups of communication devices to report the first waveform parameter and the second waveform parameter respectively.

8. The electronic device according to claim 1, wherein the first waveform parameter comprises one or more of multi carrier filter type, filter length, filter out-band attenuation, transform length of fast Fourier transform/inverse fast Fourier transform (FFT\IFFT), carrier interval, number of data streams being transmitted in parallel, and length of discrete Fourier transform (DFT) extension.

9. The electronic device according to claim 1, wherein the signal waveform comprises one or more of Universal filtered multicarrier (UFMC), cyclic prefix-orthogonal frequency division multiplexing (CP-OFDM) with weighted overlap-add (WOLA), flexible cyclic prefix-orthogonal frequency division multiplexing (FCP-OFDM), filtered-orthogonal frequency division multiplexing (F-OFDM), cyclic prefix-orthogonal frequency division multiplexing, discrete Fourier transform-spread-orthogonal frequency division multiplexing (DFT-S-OFDM).

10. A second communication device in a first group of communication devices in a communication system, wherein the communication system comprises the first group of communication devices and a second group of communication devices, the second communication device comprises a processing circuitry configured to:
determine a precoding matrix for communication of the first group of communication devices based on a first waveform parameter relating to the first group of communication devices and a second waveform parameter relating to the second group of communication devices,
wherein the first waveform parameter is related to formation of a signal waveform for communication of the first group of communication devices, and the second waveform parameter is related to formation of a signal waveform for communication of the second group of communication devices.

11. The second communication device according to claim 10, wherein the first group of communication devices comprise a first communication device and a second communication device, and the second group of communication decides comprise a third communication device and a fourth communication device, the processing circuitry being further configured to:
determine the precoding matrix to be used by the first communication device based on the first waveform parameter relating to formation of a signal waveform transmitted by the first communication device and the second waveform parameter relating to formation of a signal waveform transmitted by the third communication device.

12. The second communication device according to claim 11, wherein the processing circuitry is further configured to:
estimate channel state information of a channel between the first communication device and the second communication device, and channel state information of a channel between the third communication device and the second communication device.

13. The second communication device according to claim 12, wherein the processing circuitry is further configured to:
determine the precoding matrix to be used by the first communication device based on the channel state information estimated by the processing circuitry and channel state information estimated by the fourth communication device in the second group of communication devices.

14. The second communication device according to claim 11, wherein the processing circuitry is further configured to:
generate a precoding matrix index based on the determined precoding matrix to transmit to the first communication device.

15. A base station device in a communication system, comprising a processing circuitry configured to:

determine a precoding matrix to be used by a first terminal device served by the base station device based on a first waveform parameter of the first terminal device and a second waveform parameter of a second terminal device served by a neighboring base station, wherein the first waveform parameter is related to formation of a signal waveform transmitted by the first terminal device, and the second waveform parameter is related to formation of a signal waveform transmitted by the second terminal device.

16. The base station device according to claim 15, wherein the processing circuitry is further configured to:
estimate channel state information; and
determine the precoding matrix to be used by the first terminal device based on the estimated channel state information and channel state information estimated by the neighboring base station.

17. The base station device according to claim 16, wherein the channel state information estimated by the processing circuitry comprises channel state information of a channel between the first terminal device and the base station device, and channel state information of a channel between the second terminal device and the base station device.

18. The base station device according to claim 15, wherein the processing circuitry is further configured to:
generate a precoding matrix index based on the determined precoding matrix to transmit to the first terminal device,
wherein the precoding matrix is used for precoding a signal to be transmitted by the first terminal device, so as to eliminate interference.

19. The base station device according to claim 15, wherein the processing circuitry is further configured to: notify a second communication device in a group of communication devices managed by the base station device of the first waveform parameter of the first terminal device, such that the second communication device can determine a precoding matrix to be used by a first communication device in the group of communication devices based on the first waveform parameter.

20. The base station device according to claim 19, wherein the processing circuitry is further configured to:
assign to the first terminal device and the group of communication devices same communication resource as those assigned to the second terminal device by the neighboring base station;
instruct the first terminal device to report the first waveform parameter; and
instruct the first communication device to transmit a waveform parameter of the first communication device to the second communication device.

\* \* \* \* \*